(12) United States Patent
Kogure et al.

(10) Patent No.: US 7,864,032 B2
(45) Date of Patent: Jan. 4, 2011

(54) COLLISION DETERMINATION DEVICE AND VEHICLE BEHAVIOR CONTROL DEVICE

(75) Inventors: Masaru Kogure, Tokyo (JP); Yuichiro Tsukasaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 586 days.

(21) Appl. No.: 11/543,070

(22) Filed: Oct. 5, 2006

(65) Prior Publication Data

US 2007/0080968 A1    Apr. 12, 2007

(30) Foreign Application Priority Data

Oct. 6, 2005  (JP)  ............................ P2005-293968
Oct. 6, 2005  (JP)  ............................ P2005-293969

(51) Int. Cl.
*G60Q 1/00*   (2006.01)
*G05D 1/02*   (2006.01)
*G06F 17/10*  (2006.01)
*G06F 17/18*  (2006.01)
*G06F 19/00*  (2006.01)
*G06G 7/78*   (2006.01)
*G08G 1/16*   (2006.01)

(52) U.S. Cl. ........................ 340/435; 340/436; 701/300; 701/301; 702/181

(58) Field of Classification Search ................. 340/435, 340/436; 701/301, 300; 702/181
See application file for complete search history.

(56) References Cited

U.S. PATENT DOCUMENTS

| | | | |
|---|---|---|---|
| 6,085,151 A * | 7/2000 | Farmer et al. ................ 701/301 |
| 6,657,539 B2 * | 12/2003 | Yamamoto et al. ........... 340/438 |
| 6,853,906 B1 | 2/2005 | Michi et al. | |
| 6,859,731 B2 * | 2/2005 | Takafuji et al. .............. 701/301 |
| 7,119,888 B2 * | 10/2006 | Beuschel et al. .............. 356/28 |
| 7,243,026 B2 * | 7/2007 | Kudo .......................... 701/301 |

(Continued)

FOREIGN PATENT DOCUMENTS

EP    A 245 443 A2    10/2002

(Continued)

OTHER PUBLICATIONS

Seung Hak Rhee et al: "Collision avoidance of two moving objects using the anticipated path", APOC 2003: Asia-Pacific Optical and Wireless Communications—Mobile Service and Application Nov. 6, 2003, Wuhan, China, vol. 5283, No. 1, 2004, pp. 88-96.

(Continued)

*Primary Examiner*—Benjamin C Lee
*Assistant Examiner*—Andrew Bee
(74) *Attorney, Agent, or Firm*—McGinn IP Law Group, PLLC

(57) ABSTRACT

A control unit 5 calculates, by a statistical processing, the current front/rear-directional acceleration, the current front/rear-directional velocity, and the current front/rear-directional position of the three-dimensional object to be determined while considering an error caused by a camera. These values are used in the statistical processing so as to calculate the front/rear-directional acceleration after $\Delta t$ seconds, the front/rear-directional velocity after $\Delta t$ seconds, and the front/rear-directional position after $\Delta t$ seconds, and so as to obtain a probability of contact after $\Delta t$ seconds based on the front/rear-directional position after $\Delta t$ seconds.

20 Claims, 12 Drawing Sheets

U.S. PATENT DOCUMENTS

| | | |
|---|---|---|
| 7,409,295 B2 * | 8/2008 | Paradie ................ 701/301 |
| 7,447,593 B2 * | 11/2008 | Estkowski et al. .......... 701/301 |
| 2004/0024528 A1 * | 2/2004 | Patera et al. ............... 701/301 |
| 2005/0027402 A1 | 2/2005 | Koibuchi et al. |
| 2005/0073433 A1 * | 4/2005 | Gunderson et al. .......... 340/903 |
| 2005/0125131 A1 * | 6/2005 | Kato et al. ................... 701/70 |
| 2006/0023916 A1 * | 2/2006 | Yang et al. ................. 382/103 |

FOREIGN PATENT DOCUMENTS

| | | |
|---|---|---|
| EP | 1 331 621 A1 | 7/2003 |
| JP | 2000-276696 | 10/2000 |
| JP | 2001-354089 | 12/2001 |
| JP | 2002-260192 A | 9/2002 |
| JP | 2003-191774 | 7/2003 |
| JP | 2004-037239 | 2/2004 |
| JP | 2004-234260 A | 8/2004 |
| JP | 2005-132172 | 5/2005 |

OTHER PUBLICATIONS

Franke et al.: "Kalman filter based depth from motion with fast convergence", Intelligent Vehicles Symposium, 2005, Proceedings, IEEE Las Vegas, NV, USA Jun. 6-8, 2005, Piscataway, NJ, USA, IEEE, Jun. 6, 2005, pp. 181-186.

European Search Report dated Feb. 26, 2008.

Japanese Office Action dated Jul. 9, 2010 with English translation thereof.

Japanese Office Action dated Oct. 15, 2010 with English translation thereof.

* cited by examiner

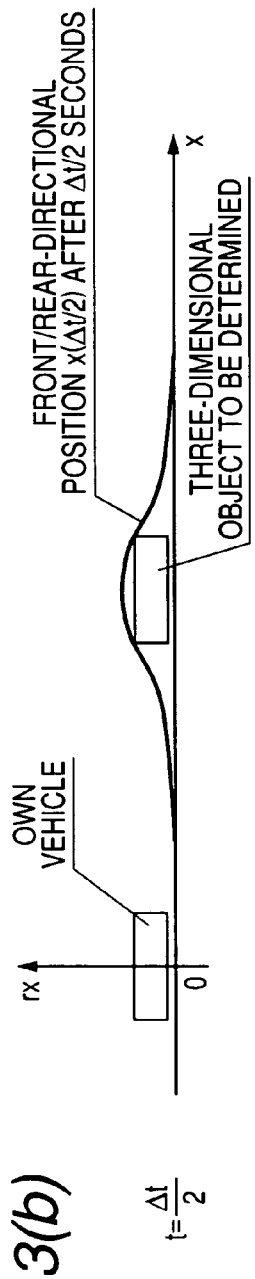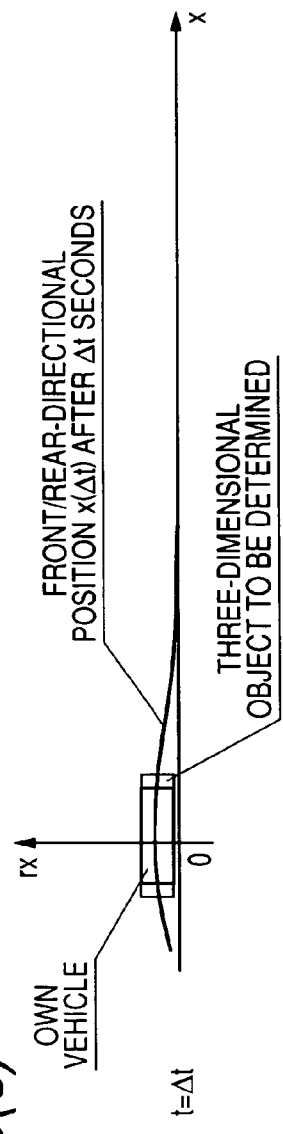

COLLISION DETERMINATION DEVICE AND VEHICLE BEHAVIOR CONTROL DEVICE

The present application claims foreign priority based on Japanese Patent Application Nos. P.2005-293968 filed on Oct. 6, 2005 and P.2005-293969 filed on Oct. 6, 2005, the contents of which are incorporated herein by reference.

BACKGROUND OF THE INVENTION

1. Field of the Invention

The present invention relates to a collision determination device that determines a possibility of contact of an own vehicle with a three-dimensional object ahead of the own vehicle detected by a stereo camera, a single-lens camera or a millimeter wave radar, and to a vehicle behavior control device that operates an appropriate actuator to guide the own vehicle to travel on the most favorable path, thereby controlling the vehicle behavior based on the possibility of contact.

2. Related Art

Recently, more vehicles have mounted multiple vehicle behavior control devices such as automatic braking devices and four-wheel drive control devices. Techniques have been proposed to integrate these vehicle behavior control devices (for example, JP-A-2003-191774).

Further, a driving assistance control device have been proposed that use a car-mounted camera to photograph a front traveling environment and recognize a three-dimensional object in a front to estimate a possibility of collision of the own vehicle with such a three-dimensional object (for example, JP-A-2004-037239).

While precise recognition of the position of a three-dimensional object ahead is required of such a device for estimating the possibility of collision between the three-dimensional object ahead and the own vehicle, detection using a camera includes an error. It is thus necessary to identify the position of a three-dimensional object ahead while considering the error.

JP-A-2004-037239 discloses a technique where, based on the normal distribution concerning the positional/velocity errors occurring when each of the plurality of sensors has detected a same object, first and second probabilities are calculated as probabilities of each of the detected objects being the same object in terms of position and velocity from the identified positional and velocity errors and a third probability is calculated as a probability of each of the detected objects being the same object based on the first probability and the second probability, and in case the third probability has exceeded a threshold, each of the detected objects is determined as the same object.

However, as disclosed in JP-A-2004-037239, it is impossible to correctly estimate a change of position of the three-dimensional object ahead before it comes into contact with the own vehicle even in case the current position of the three-dimensional object is correctly determined. Such uncertainties become more serious as an error caused by a camera for detecting the three-dimensional object ahead becomes large. A more practical system is desirable that considers such uncertainties in the control of a vehicle.

Further, the vehicle behavior control device disclosed in JP-A-2003-191774 does not consider integration with a driving assistance control device such as one disclosed in JP-A-2004-037239. Thus, coordinated control with the driving assistance control device is not very efficient. In terms of coordination between the vehicle behavior control device disclosed in JP-2003-191774 and the driving assistance control device disclosed in JP-A-2004-037239, a problem must be solved of how to effectively share the control amount by the vehicle behavior control device and the control amount by the driving assistance control device.

The invention has been accomplished in view of the aforementioned circumstances. An object of the invention is to provide a collision determination device that estimates the possibility of a three-dimensional object a head being contact with an own vehicle by a statistical processing without correctly obtaining the position of the three-dimensional object so as to control the own vehicle with a natural feel.

In addition, another object of the invention is to provide a vehicle behavior control device capable of efficiently and stably performing the above coordinated control.

SUMMARY OF THE INVENTION

In accordance with one or more embodiments of the present invention, in a first aspect of the invention, a collision determination device is provided with: three-dimensional object detection means for detecting a three-dimensional object existing around an own vehicle; current state processing means for calculating current motion and positional states of the three-dimensional object by a statistical processing; state estimation means for estimating motion and positional states of the three-dimensional object after a preset time period, by a statistical processing, based on the calculated current motion and positional states; and contact probability calculation means for calculating a probability of contact of the own vehicle with the three-dimensional object based on the estimated positional state of the three-dimensional object after the preset time period.

Further, according to a second aspect of the invention, in the collision determination device of the first aspect, the collision determination device may be mounted on a movable body, and the collision determination device may further be provided with control means for performing at least one of the deceleration control, alarm control and provision of alert information based on the contact probability.

Further, according to a third aspect of the invention, in the collision determination device of the first or second aspect, the three-dimensional object may be a three-dimensional object existing ahead of the own vehicle, the current motion and positional states of the three-dimensional object calculated by the current state processing means by the statistical processing may be obtained by using a front/rear-directional distribution of the own vehicle, the motion and positional states of the three-dimensional object after the preset time period estimated by the state estimation means may be obtained by using a front/rear-directional distribution of the own vehicle after the preset time period, and the contact probability calculation means may calculate the probability of contact based on the front/rear-directional distribution of the positional states of the three-dimensional object after the preset time period and the position of the own vehicle.

Further, according to a fourth aspect of the invention, in the collision determination device of the first or second aspect, the three-dimensional object may be a three-dimensional object existing on a plane ahead of the own vehicle, the current motion and positional states of the three-dimensional object calculated by the current state processing means by the statistical processing may be obtained by using a front/rear-directional distribution and a lateral distribution of the own vehicle, the motion and positional states of the three-dimensional object after the preset time period estimated by the determination object state estimation means may be obtained by using the front/rear-directional distribution and the lateral distribution of the own vehicle after the preset time period, and the contact probability calculation means may calculate the probability of contact based on the front/rear-directional distribution and the lateral distribution of the positional state of the three-dimensional object after the preset time period and the position of the own vehicle.

Further, according to a fifth aspect of the invention, the collision determination device of the fourth aspect may further be provided with target three-dimensional object selection means for extracting three-dimensional objects for determining possibilities of contact from among the detected three-dimensional objects, and more than one three-dimensional objects may be selected by the target three-dimensional object selection means.

Further, according to a sixth aspect of the invention, in the collision determination device of the fifth aspect, the control means may perform at least one of the deceleration control, the alarm control and the provision of alert information based on the sum value of the contact probability calculated for each of the target three-dimensional objects.

In addition, in accordance with one or more embodiments of the present invention, in a seventh aspect of the invention, a vehicle behavior control device is provided with: target behavior calculation means for calculating a target behavior of an own vehicle based on a driving state of the own vehicle; three-dimensional object information detection means for detecting three-dimensional object information ahead of the own vehicle; determination object selection means for extracting a determination object whose possibility of contact with the own vehicle is determined out of the detected three-dimensional objects; determination object current state processing means for calculating a current motion and positional states of the determination object; determination object state estimation means for estimating the motion and positional states of the determination object after a preset time period based on the calculated current motion and positional states of the determination object; contact probability calculation means for calculating a probability of contact of the own vehicle with the determination object based on the motion and positional states of the determination object after the preset time period estimated by the determination object state estimation means; target behavior correction amount calculation means for setting an objective function relating at least the probability of contact and a target behavior correction amount and providing a minimum value, and calculating the target behavior correction amount where the objective function takes the minimum value; and control means for setting a control amount based on the target behavior and the target behavior correction amount.

Further, according to an eighth aspect of the invention, in the vehicle behavior control device of the seventh aspect, the target behavior of the own vehicle calculated by the target behavior calculation means may include a target front/rear-directional force and a target yaw moment.

Further, according to a ninth aspect of the invention, in the vehicle behavior control device of the seventh aspect, the determination object current state processing means may calculate the current motion and positional states of the determination object by a statistical processing, and the determination object state estimation means may estimate the motion and positional states of the determination object after the preset time period based on the current motion and positional states of the determination object calculated by the statistical processing.

Further, according to a tenth aspect of the invention, in the vehicle behavior control device of any one of seventh to ninth aspects, the determination object extracted by the determination object selection means may be three-dimensional objects existing on a plane ahead of the own vehicle, the current motion and positional states of the determination object calculated by the determination object current state processing means by the statistical processing may be obtained by using the front/rear-directional distribution and lateral distribution of the own vehicle, the motion and positional states of the determination object after the preset time period estimated by the determination object state estimation means may be obtained by using the front/rear-directional distribution and lateral distribution of the own vehicle after the preset time period, and the contact probability calculation means may calculate the probability of contact based on the front/rear-directional distribution and lateral distribution of the positional state of the determination object after the preset time period and the position of the own vehicle.

Further, according to an eleventh aspect of the invention, in the vehicle behavior control device according to the tenth aspect, more than one determination objects may be set by the determination object selection means.

Further, according to twelfth aspect of the invention, the vehicle behavior control device of any one of seventh to eleventh aspects may further be provided with: frictional circle utilization factor calculation means for calculating a frictional circle utilization factor of the own vehicle after the preset time period, and the target behavior correction amount calculation means may preset the objective function including at least the frictional circle utilization factor, the probability of contact and the target behavior correction amount and providing the minimum value, and may calculate the target behavior correction amount where the objective function takes the minimum value.

The collision determination device according to one or more embodiments of the invention estimates a possibility of a three-dimensional object ahead to be contact with an own vehicle by a statistical processing without correctly obtaining the position of the three-dimensional object, and allows the user to control the own vehicle with a natural feel.

In addition, according to the vehicle behavior control device of one or more embodiments of the invention, it is possible to integrate vehicle behavior control and driving assistance control to provide efficient and stable coordinated control of these features.

Other aspects and advantages of the invention will be apparent from the following description and the appended claims.

BRIEF DESCRIPTION OF THE DRAWINGS

FIGS. 3(a) to 3(c) explain statistical positions of a three-dimensional object to be determined from a present time to Δt seconds later according to the first exemplary embodiment of the invention.

DESCRIPTION OF THE REFERENCE NUMERALS AND SIGNS

Figure 1:
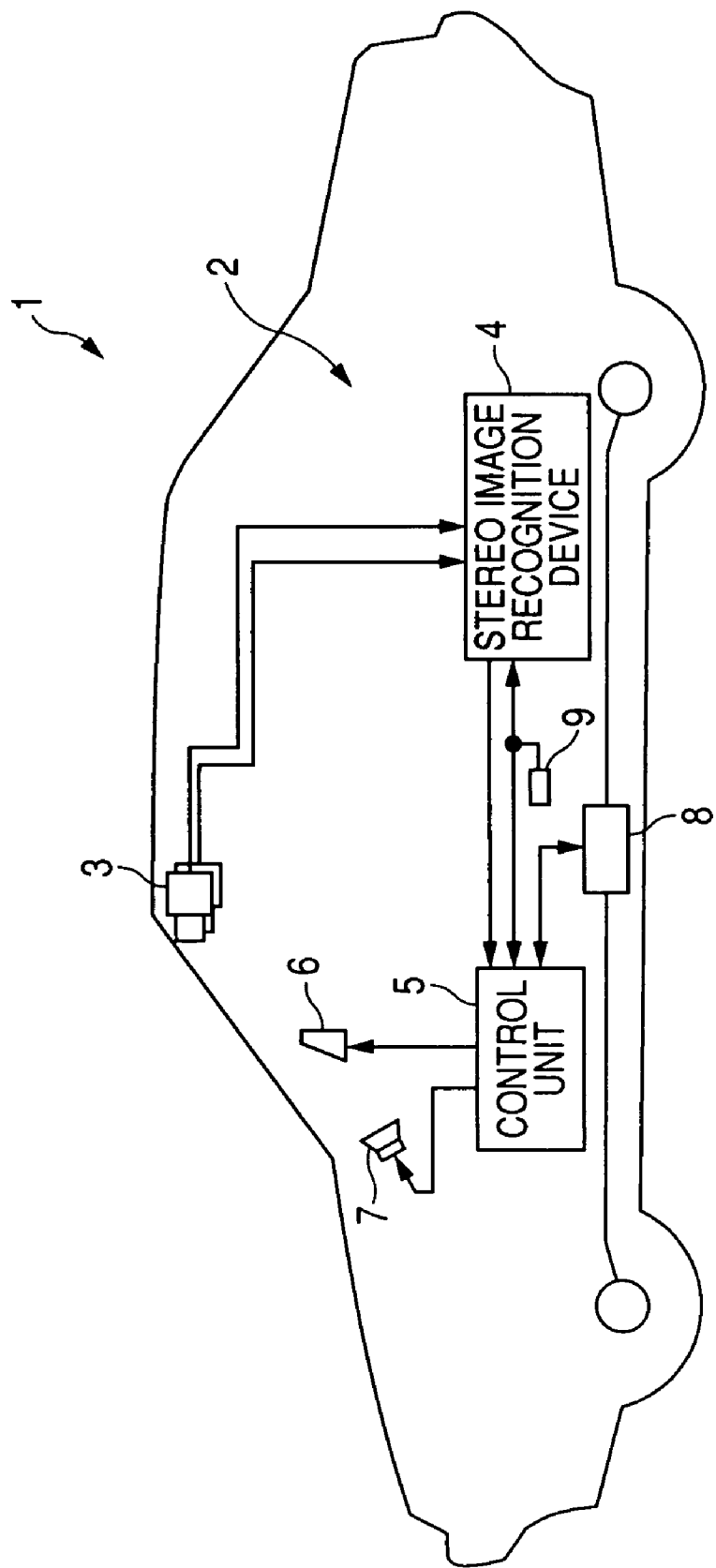
FIG. 1 is a general block diagram of a driving assistance control device mounted on a vehicle according to a first exemplary embodiment of the invention.

1: Own vehicle
2: Vehicle driving assistance control device (collision determination device)
3: Stereo camera (three-dimensional object information detection means, determination object selection means)
4: Stereo image recognition device (three-dimensional object information detection means, determination object selection means)
5: Control unit (current state processing means, state estimation means, contact probability calculation means, control means)
6: Monitor
7: Loud speaker
8: Automatic brake control device
9: Vehicle velocity sensor
101: Own vehicle
112fl, 112fr, 112rl, 112rr: Four wheels
113: Brake driving part
116fl, 116fr, 116rl, 116rr: Wheel cylinder
121fl, 121fr, 121rl, 121rr: Vehicle velocity sensor
122: Steering wheel sensor
123: Accelerator opening sensor
124: Brake pedal sensor
125: Yaw rate sensor
126: Front/rear-directional acceleration sensor
135L, 135R: CCD camera (three-dimensional object information detection means, determination object selection means)
136: Stereo image recognition device (three-dimensional object information detection means, determination object selection means)
140: Control unit (target behavior calculation means, determination object current state processing means, determination object state estimation means, contact probability calculation means, target behavior correction amount calculation means, control means, frictional circle utilization factor calculation means)

DETAILED DESCRIPTION OF THE EXEMPLARY EMBODIMENTS

Exemplary embodiments of the invention will be described with reference to the accompanying drawings.

Figure 2:
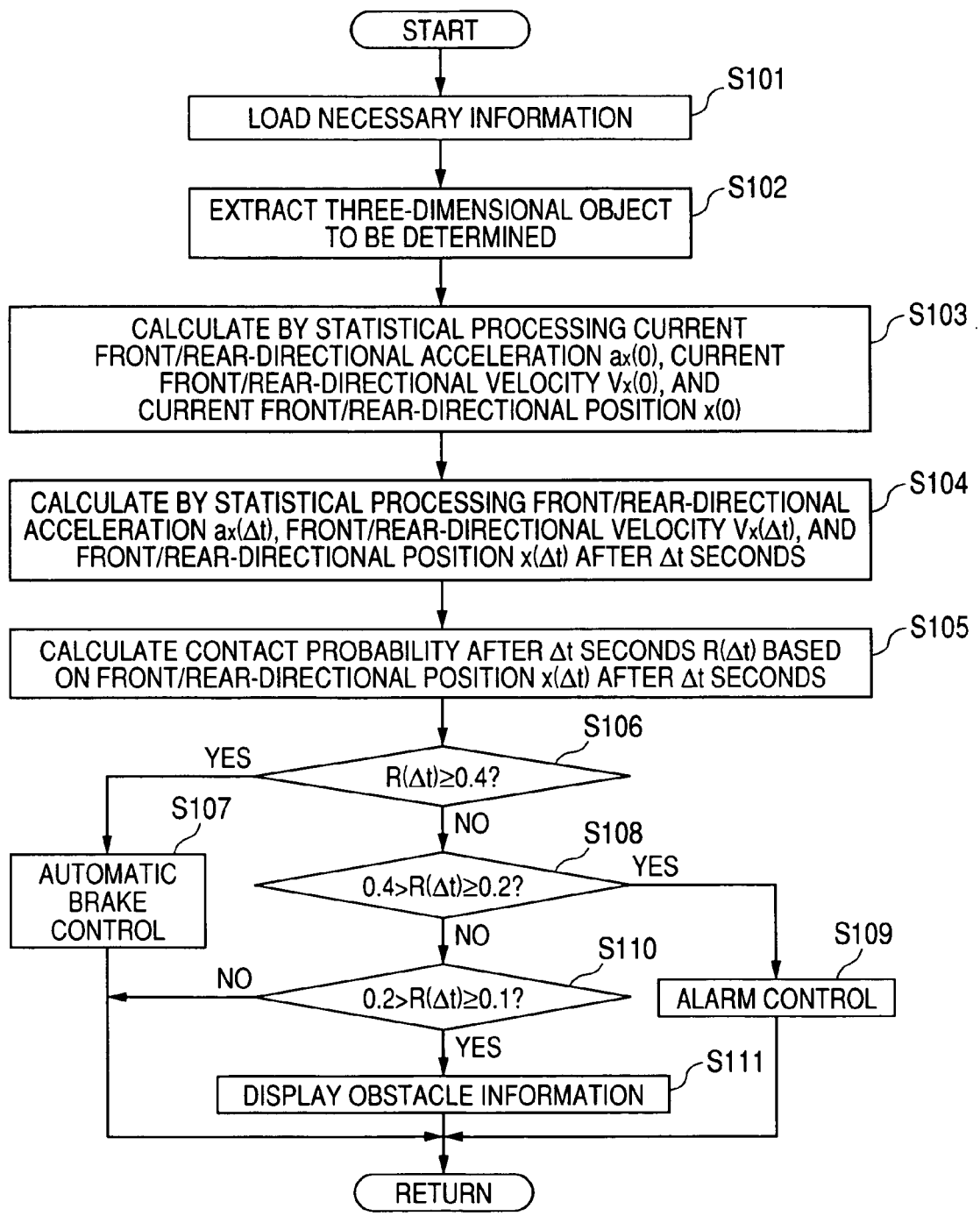
FIG. 2 is a flowchart of a driving assistance control program according to the first exemplary embodiment of the invention.
Figure 4:
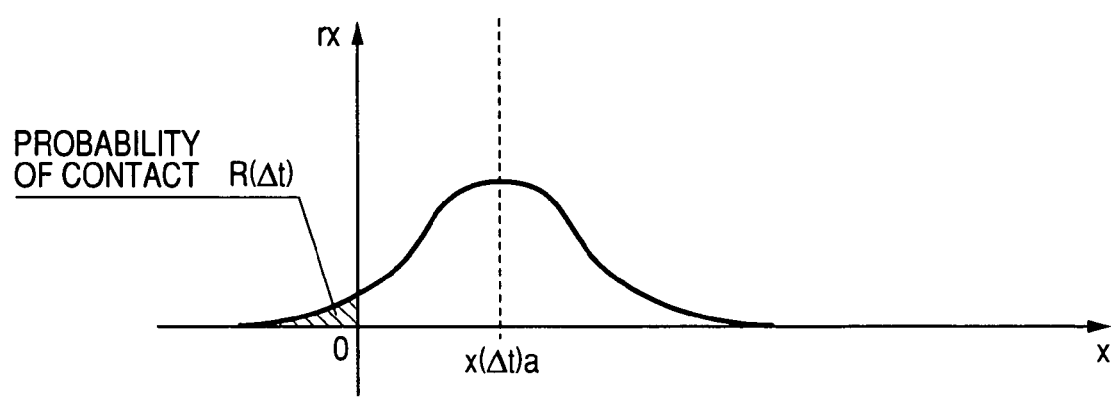
FIG. 4 explains a probability of contact according to the first exemplary embodiment of the invention.

FIGS. 1 through 4 show a first exemplary embodiment of the invention. FIG. 1 is a general block diagram of a driving assistance control device mounted on a vehicle. FIG. 2 is a flowchart of a driving assistance control program. FIGS. 3(a) to 3(c) explain statistical positions of a three-dimensional object as a determination object from the present time to Δt seconds later. FIG. 4 explains the probability of contact.

In FIG. 1, a numeral 1 shows a vehicle (own vehicle) such as an automobile on which a vehicle driving assistance control device 2 as a collision determination device is mounted. The vehicle driving assistance control device 2 mainly includes a stereo camera 3, a stereo image recognition device 4, and a control unit 5. The vehicle driving assistance control device 2 is basically controlled by a driving assistance control program described later and keeps the current vehicle state, displays obstacle information, or performs alarm control or automatic brake control depending on the probability of contact with a three-dimensional object ahead (corresponding arithmetic calculation will be described later).

In case there is only a low probability of contact with a three-dimensional object ahead, the current vehicle state is maintained. When the probability of contact increases, the driver is provided with corresponding information through a monitor 6 (obstacle information display). When the probability of contact further increases, a voice alarm is issued from a loudspeaker 7 (alarm control). When the probability of contact further rises, a deceleration signal is output to an automatic brake control device 8 to effect certain automatic braking (automatic brake control).

The stereo camera 3 is composed of a pair of (left/right) CCD cameras using a solid-state image pickup device such as a charge-coupled device as a stereo optical system. The left and right CCD cameras are respectively mounted in a front area of a ceiling of a cabin with a preset spacing and perform stereophonic imaging of an object outside the vehicle from different viewpoints and outputs imaging signals to the stereo image recognition device 4 described later.

The vehicle 1 is provided with a vehicle velocity sensor 9 for detecting the velocity of the own vehicle. A velocity of the own vehicle V0 is output to the stereo image recognition device 4 and the control unit 5.

The stereo image recognition device 4 receives an image from the stereo camera 3 and the velocity of the own vehicle V0 from the vehicle velocity sensor 9. Based on the image from the stereo camera 3, the stereo image recognition device 4 detects the data of the three-dimensional objects ahead of the own vehicle and forward information of white line data so as to estimate the travel path of the vehicle 1 (travel path of the own vehicle). The stereo image recognition device 4 extracts one three-dimensional object closest to the own vehicle on the travel path of the own vehicle, from the three-dimensional objects, as a determination object for which the probability of contact with the own vehicle 1 is determined. The stereo image recognition device 4 then outputs data including a distance x from the own vehicle to the three-dimensional object to be determined, a front/rear-directional velocity Vx (differential value of distance x+velocity of own vehicle V0) of the three-dimensional object to be determined, and a front/rear-directional acceleration ax (differential value of front/rear-directional velocity Vx) of the three-dimensional object to be determined.

Processing of an image from the stereo camera 3 by the stereo image recognition device 4 is made for example in the following way. Distance information is generated using the deviation amount between corresponding positions through the triangulation technique from a stereo image ahead of the own vehicle 1 photographed with the stereo camera 3. The data undergoes well-known grouping processing, or is compared with pre-stored three-dimensional road shape data and three-dimensional object data to extract three-dimensional object data including white line data, side wall data such as data of a guardrail and a curb along the road, and data of a vehicle or a pedestrian. The three-dimensional object data is used to obtain the distance to the three-dimensional object and the temporal change of the distance (relative velocity with respect to the own vehicle 1) and extract a three-dimensional object closest to the own vehicle 1 existing on the travel path of the own vehicle as a three-dimensional object to be determined. In this way, the stereo camera 3 and the stereo image recognition device 4 are provided as three-dimensional object information detection means and determination object selection means.

The control unit 5 receives from the stereo image recognition device 4 the data including the distance x to the three-dimensional object to be determined, the front/rear-directional velocity Vx (differential value of distance x+velocity of own vehicle V0) of the three-dimensional object to be determined, and the front/rear-directional acceleration ax (differential value of front/rear-directional velocity Vx) of the three-dimensional objects to be determined, and the velocity of the own vehicle V0 from the vehicle velocity sensor 9.

The control unit 5 assumes that each of the data including the distance x to the three-dimensional object to be determined, the front/rear-directional velocity Vx ((differential value of distance x+velocity of the own vehicle V0) of the three-dimensional object to be determined, and the front/rear-directional acceleration ax (differential value of velocity Vx of the own vehicle) of the three-dimensional object to be determined is output in a normal distribution whose axes are on a true value and extending in the front/rear-direction of the vehicle (x-axis). And, the control unit 5 performs statistical processing to calculate a current front/rear-directional acceleration ax(0), a current front/rear-directional velocity Vx(0), and a current front/rear-directional position x(0) of the three-dimensional object to be determined in the following way. Note that $-\infty < x < \infty$ in each normal distribution described below and the dispersion of each normal distribution has a positive value.

That is, the current front/rear-directional acceleration ax(0) is calculated using $ax(ax(0)a, \sigma ax(0)^2)$ as a normal distribution having an average value ax(0)a of the current front/rear-directional acceleration and a dispersion $\sigma ax(0)^2$ indicated by the deviation $\sigma ax(0)$ of the current front/rear-directional acceleration.

$$ax(ax(0)a, \sigma ax(0)^2) = (1/((2 \cdot \pi)^{1/2} \cdot \sigma ax(0))) \cdot \exp(-(x - ax(0)a)^2/(2 \cdot \sigma ax(0)^2)) \quad (1)$$

The current front/rear-directional velocity Vx(0) is calculated using $Vx(Vx(0)a, \sigma vx(0)^2)$ as a normal distribution having an average value Vx(0)a of the current front/rear-directional velocity and a dispersion $\sigma vx(0)^2$ indicated by the deviation $\sigma vx(0)$ of the current front/rear-directional velocity.

$$Vx(Vx(0)a, \sigma vx(0)^2) = (1/((2 \cdot \pi)^{1/2} \cdot \sigma vx(0))) \cdot \exp(-(x - Vx(0)a)^2/(2 \cdot \sigma vx(0)^2)) \quad (2)$$

The current front/rear-directional position x(0) is calculated using $x(x(0)a, \sigma x(0)^2)$ as a normal distribution having an average value x(0)a of the current front/rear-directional position and a dispersion $\sigma x(0)^2$ indicated by the deviation $\sigma x(0)$ of the current front/rear-directional position.

$$x(x(0)a, \sigma x(0)^2) = (1/((2 \cdot \pi)^{1/2} \cdot \sigma x(0))) \cdot \exp(-(x - x(0)a)^2/(2 \cdot \sigma x(0)^2)) \quad (3)$$

The above dispersions $\sigma ax(0)^2$, $\sigma vx(0)^2$, $\sigma x(0)^2$ are values preset by the stereo image recognition device 4 or a recognition target object. While, in the first exemplary embodiment, the recognition result of the stereo camera is used, recognition using a millimeter wave radar has a higher velocity accuracy, which allows setting of a small dispersion.

The control unit 5 assumes and calculates the state after a preset time of $\Delta t$ seconds (for example, after 0.5 seconds) based on the current front/rear-directional acceleration ax(0), the current front/rear-directional velocity Vx(0), and the current front/rear-directional position x(0) thus calculated.

The front/rear-directional acceleration after $\Delta t$ seconds $ax(\Delta t)$ is calculated using $ax(ax(\Delta t)a, \sigma ax(\Delta t)^2)$ as a normal distribution having an average value $ax(\Delta t)a$ of the front/rear-directional acceleration and a dispersion $\sigma ax(\Delta t)^2$ indicated by the deviation $\sigma ax(\Delta t)$ of the front/rear-directional acceleration after $\Delta t$ seconds. In this exemplary embodiment, the calculation assumes a uniform acceleration.

$$\begin{aligned} ax(\Delta t) &= ax(ax(0)a, \sigma ax(0)^2) \\ &= ax(ax(\Delta t)a, \sigma ax(\Delta t)^2) \end{aligned} \quad (4)$$

The front/rear-directional velocity after $\Delta t$ seconds $Vx(\Delta t)$ is calculated using $Vx(Vx(\Delta t)a, \sigma vx(\Delta t)^2)$ as a normal distribution having an average value $Vx(\Delta t)a$ of the front/rear-directional velocity after $\Delta t$ seconds and a dispersion $\sigma vx(\Delta t)^2$ indicated by the deviation $\sigma vx(\Delta t)$ of the front/rear-directional velocity after $\Delta t$ seconds. In this case, calculation is made by using the current front/rear-directional acceleration ax(0) and the current front/rear-directional velocity Vx(0) in accordance with the expression (5).

$$\begin{aligned} Vx(\Delta t) &= Vx(Vx(0)a, \sigma vx(0)^2) + ax(ax(0)a, \sigma ax(0)^2) \cdot \Delta t \\ &= Vx(Vx(0)a + ax(0)a \cdot \Delta t, (\sigma vx(0) + \sigma ax(0) \cdot \Delta t)^2) \\ &= Vx(Vx(\Delta t)a, \sigma vx(\Delta t)^2) \end{aligned} \quad (5)$$

The front/rear-directional position after $\Delta t$ seconds $x(\Delta t)$ is calculated using $x(x(\Delta t)a, \sigma x(\Delta t)^2)$ as a normal distribution having an average value $x(\Delta t)a$ of the front/rear-directional position and a dispersion $\sigma x(\Delta t)^2$ indicated by the deviation $\sigma x(\Delta t)$ of the front/rear-directional position after $\Delta t$ seconds.

In this case, calculation is made by using the current front/rear-directional acceleration ax(0), the current front/rear-directional velocity Vx(0) and the current front/rear-directional position x(0) in accordance with the expression (6).

$$\begin{aligned} x(\Delta t) &= x(x(0)a, \sigma x(0)^2) + Vx(Vx(0)a, \sigma vx(0)^2) \cdot \Delta t + \\ &\quad (1/2) \cdot ax(ax(0)a, \sigma ax(0)^2) \cdot \Delta t^2 \\ &= x(x(0)a + Vx(0)a \cdot \Delta t + (1/2) \cdot ax(0)a \cdot \Delta t^2, \\ &\quad (\sigma x(0) + \sigma vx(0) \cdot \Delta t + (1/2) \cdot \sigma ax(0) \cdot \Delta t^2)^2) \\ &= x(x(\Delta t)a, \sigma x(\Delta t)^2) \end{aligned} \quad (6)$$

The control unit 5 calculates the probability of contact $R(\Delta t)$ with the three-dimensional object in accordance with the expression (7) based on the front/rear-directional position of the three-dimensional object as a determination object after $\Delta t$ seconds and the position of the own vehicle 1 obtained by the expression (6), and keeps the current vehicle state, displays obstacle information, or performs alarm control or automatic brake control depending on the magnitude of the value of the probability of contact $R(\Delta t)$.

$$R(\Delta t) = \int (x(x, (\Delta t)a, \sigma x(\Delta t)^2))dx \quad (7)$$

(the range of integration is $-\infty < x < 0$)

Assuming that the current front/rear-directional position $x(0)$ is indicated by normal distribution as shown in FIG. 3(a), it is estimated that the front/rear-directional position $x(\Delta t/2)$ after $\Delta t/2$ will be in the position shown in FIG. 3(b) and the front/rear-directional position $x(\Delta t)$ after $\Delta t$ will be in the position shown in FIG. 3(c).

As shown in FIG. 4, these estimated positions are integrated assuming that the position of the own vehicle 1 is 0 on the x-axis (integration range: $-\infty<x<0$) and its area is calculated using a probability of contact $R(\Delta t)$. The front/rear-directional position x of the three-dimensional object to be determined after $\Delta t$ $x(\Delta t)$ is a function of a normal distribution, so that the result of integration in the range of $-\infty<x<\infty$ is 1.0.

In this way, in the first exemplary embodiment, the control unit 5 includes the features of current state processing means, state estimation means, contact probability calculation means, and control means.

Next, a driving assistance control program according to the first exemplary embodiment executed by the vehicle driving assistance control device 2 will be described referring to the flowchart of FIG. 2.

In step 101 (S101), necessary information (image information, velocity of the own vehicle V0) is loaded. In S102, the stereo image recognition device 4 extracts a three-dimensional object as a determination object. In the first exemplary embodiment, the three-dimensional object on the travel path of the own vehicle closest to the own vehicle is extracted from three-dimensional objects as the three-dimensional object to be determined.

Next, in S103, the control unit 5 calculates, by a statistical processing, the current front/rear-directional acceleration $ax(0)$, the current front/rear-directional velocity $Vx(0)$, and the current front/rear-directional position $x(0)$ of the three-dimensional object to be determined, by using the expressions (1), (2) and (3) given above.

In S104, the control unit 5 calculates, by a statistical processing, the front/rear-directional acceleration after $\Delta t$ seconds $ax(\Delta t)$, the front/rear-directional velocity after $\Delta t$ seconds $Vx(\Delta t)$, and the front/rear-directional position after $\Delta t$ seconds $x(\Delta t)$ of the three-dimensional object to be determined, by using the expressions (4), (5) and (6) given below.

In S105, the control unit 5 calculates, by a statistical processing, the probability of contact after $\Delta t$ seconds $R(\Delta t)$ based on the front/rear-directional position after $\Delta t$ seconds $x(\Delta t)$ of the three-dimensional object to be determined, by using the expression (7) given above.

In S106, the control unit 5 determines whether the probability of contact after $\Delta t$ seconds $R(\Delta t)$ is 0.4 or more. In case the probability is 0.4 or more, execution proceeds to S107, where a deceleration signal is output to an automatic brake control device 8 to operate certain automatic braking and the program is exited.

In case the probability of contact after $\Delta t$ seconds $R(\Delta t)$ is less than 0.4 as a result of determination in S106, execution proceeds to S108, where it is determined whether the probability of contact after $\Delta t$ seconds $R(\Delta t)$ is 0.2 or more.

In case the probability of contact after $\Delta t$ seconds $R(\Delta t)$ is 0.2 or more as a result of determination in S108, execution proceeds to S109, where a voice alarm is issued from a loud speaker 7 and the program is exited.

In case the probability of contact after $\Delta t$ seconds $R(\Delta t)$ is less than 0.2 as a result of determination in S108, execution proceeds to S110, where it is determined whether the probability of contact after $\Delta t$ seconds $R(\Delta t)$ is 0.1 or more.

In case the probability of contact after $\Delta t$ seconds $R(\Delta t)$ is 0.1 or more as a result of determination in S110, execution proceeds to S111, where the driver is provided with corresponding information through a monitor 6 and the program is exited. In case the probability is less than 0.1, the program is exited without notifying the driver.

In this way, according to the first exemplary embodiment, the current front/rear-directional acceleration $ax(0)$, the current front/rear-directional velocity $Vx(0)$, and the current front/rear-directional position $x(0)$ of the three-dimensional object to be determined are calculated by way of statistical processing while considering an error caused by a camera. These values are used in statistical processing to obtain the probability of contact after $\Delta t$ seconds $R(\Delta t)$ based on the front/rear-directional acceleration after $\Delta t$ seconds $ax(\Delta t)$, the front/rear-directional velocity after $\Delta t$ seconds $Vx(\Delta t)$, and the front/rear-directional position after $\Delta t$ seconds $x(\Delta t)$ It is thus possible to statistically consider and estimate the possibility of a three-dimensional object ahead coming in contact with the own vehicle 1 without correctly obtaining the position of the three-dimensional object, thereby making control with a natural feel.

Figure 5:
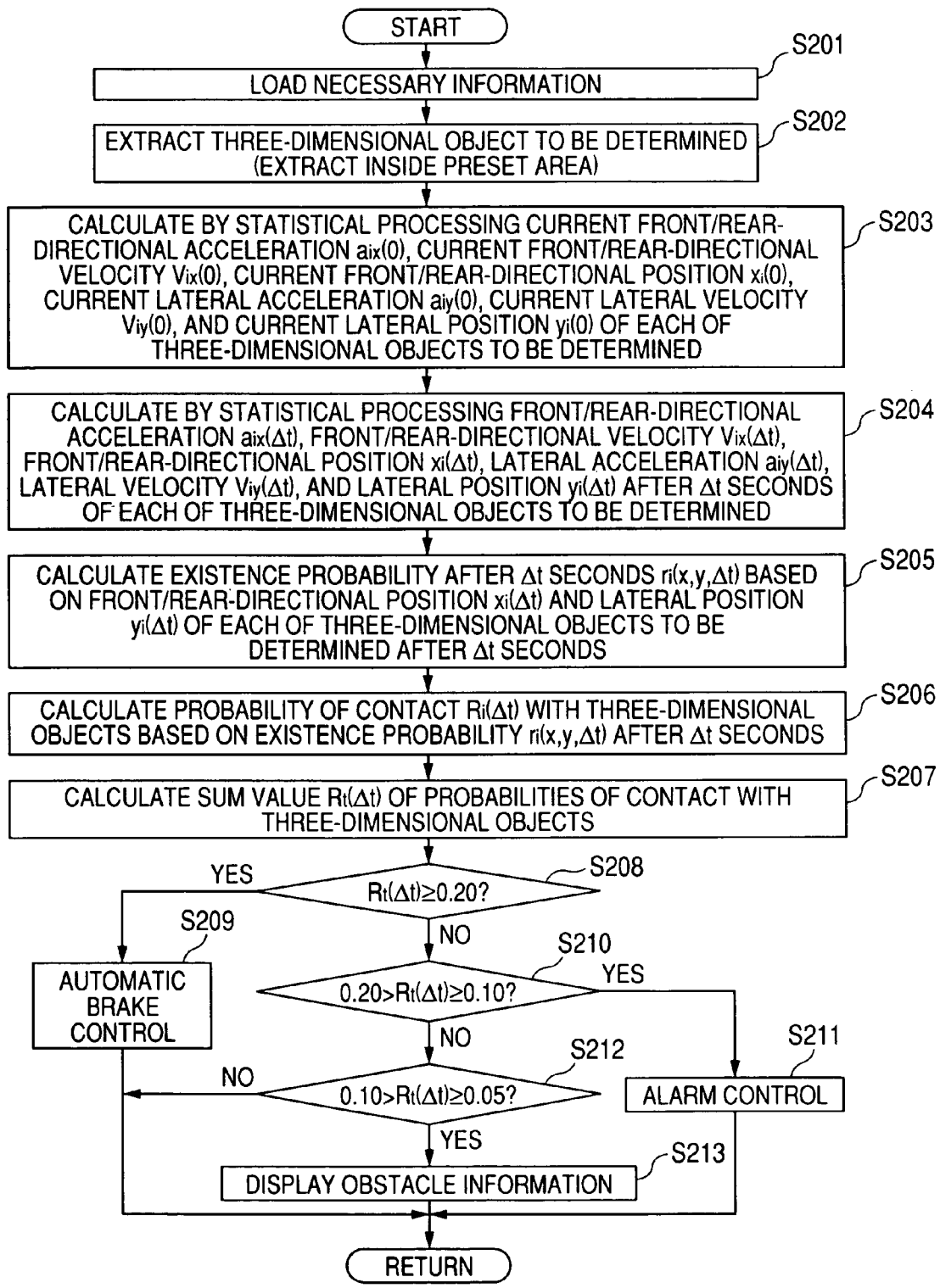
FIG. 5 is a flowchart of a driving assistance control program according to a second exemplary embodiment of the invention.
Figure 6A:
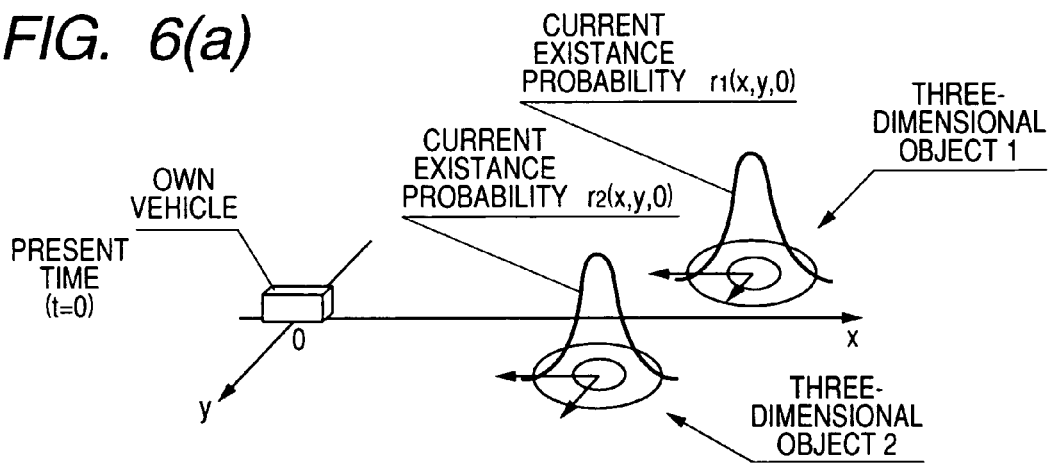
FIGS. 6(a) to 6(c) explain statistical positions of three-dimensional objects to be determined from a present time to Δt seconds later according to the second exemplary embodiment of the invention.
Figure 6B:
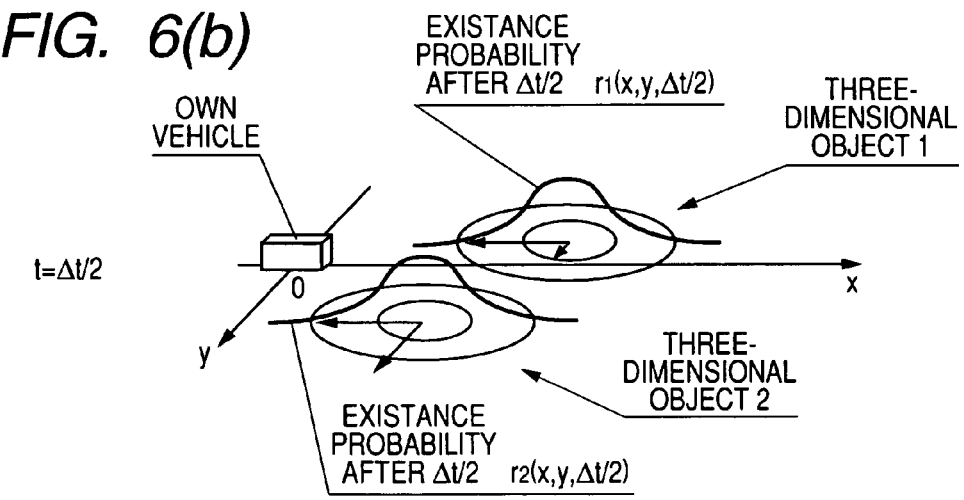
Figure 6C:
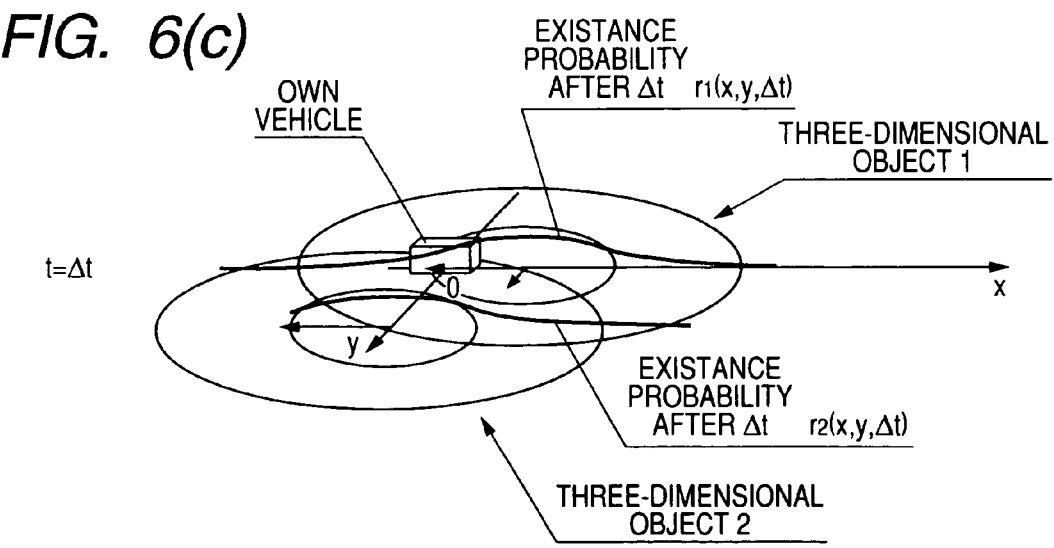
Figure 7:
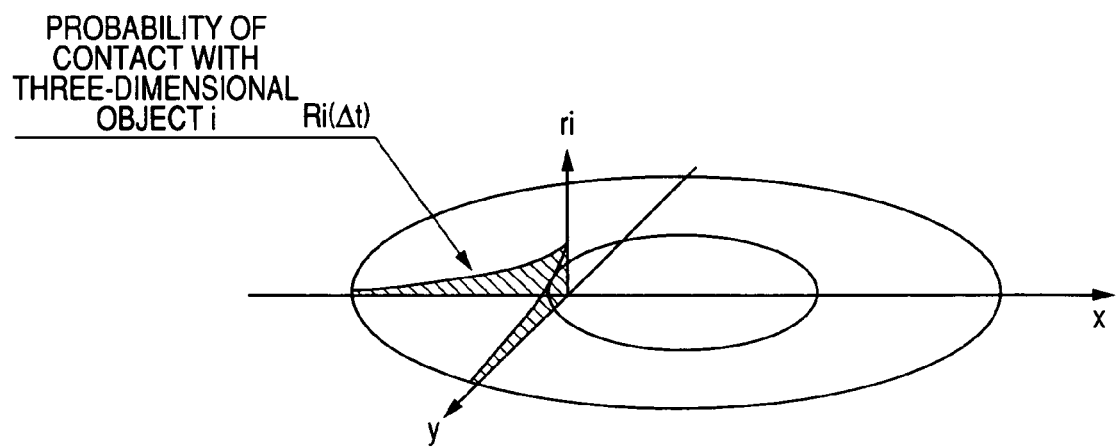
FIG. 7 explains a probability of contact according to the second exemplary embodiment of the invention.

FIGS. 5 through 7 show the second exemplary embodiment of the invention. FIG. 5 is a flowchart of a driving assistance control program. FIG. 6 explains the statistical positions of three-dimensional object to be determined from the present time to $\Delta t$ seconds later. FIG. 7 explains the probability of contact. The second exemplary embodiment of the invention differs from the first exemplary embodiment in that three-dimensional objects to be determined are ones on a plane ahead. The other structures and working effects are substantially the same as those of the first exemplary embodiment, so that the same part is given the same sign and corresponding description is omitted.

Referring to FIG. 1 of the first exemplary embodiment, the stereo image recognition device 4 presets a determination-target area out of the image area from the stereo camera 3 and extracts all three-dimensional objects existing in the preset area as three-dimensional objects to be determined. On this occasion, the identification number i of each three-dimensional object extracted as a determination object is 1 to n (hereinafter a sign "i" is the number pertaining to each three-dimensional object) The three-dimensional objects to be determination object may be the nearest three-dimensional object or n three-dimensional objects located in the nearest position in the preset area.

The control unit 5 receives from the stereo image recognition device 4 the data including the distance xi to each of the three-dimensional objects to be determined, the lateral position yi of each of the three-dimensional objects to be determined relative to a center coordinate axis on the travel path of the own vehicle, the front/rear-directional velocity Vix (differential value of distance xi+velocity of own vehicle V0) of each of the three-dimensional objects to be determined, the lateral velocity Viy (differential value of lateral position yi) of each of the three-dimensional objects to be determined, the front/rear-directional acceleration aix (differential value of front/rear-directional velocity Vix) of each of the three-dimensional objects to be determined, and the lateral acceleration aiy (differentia value of lateral velocity Viy) of each of the three-dimensional objects to be determined, as well as the velocity of the own vehicle V0 from the vehicle velocity sensor 9.

The control unit 5 assumes that each of the data including the distance xi to each of the three-dimensional objects to be determined, the front/rear-directional velocity Vix (distance x+velocity of own vehicle V0) of each of the three-dimensional objects to be determined, and the front/rear-directional acceleration aix (differential value of front/rear-directional velocity Vix) of each of the three-dimensional objects to be determined is output in a normal distribution whose axis is on a true value and extending in the front/rear-direction of the vehicle (x-axis). And, the control unit 5 performs statistical processing so as to calculate the current front/rear-directional acceleration aix(0), the current front/rear-directional velocity Vix(0), and the current front/rear-directional position xi(0) of each of the three-dimensional objects to be determined in the following way. Note that $-\infty < x < \infty$ in each normal distribution described below and the dispersion of each normal distribution has a positive value.

Thus, the current front/rear-directional acceleration aix(0) is calculated using aix(aix(0)a,σiax(0)$^2$) as a normal distribution having an average value aix(0)a of the current front/rear-directional acceleration and a dispersion σiax(0)$^2$ indicated by the deviation σiax(0) of the current front/rear-directional acceleration.

$$aix(aix(0)a, \sigma iax(0)^2) = (1/((2 \cdot \pi)^{1/2} \cdot \sigma iax(0))) \cdot \exp(-(x - aix(0)a)^2/(2 \cdot \sigma iax(0)^2)) \qquad (8)$$

The current front/rear-directional velocity Vix(0) is calculated using Vix(Vix(0)a,σivx(0)$^2$) as a normal distribution having an average value Vix(0)a of the current front/rear-directional velocity and a dispersion σivx(0)$^2$ indicated by the deviation σivx(0) of the current front/rear-directional velocity.

$$Vix(Vix(0)a, \sigma ivx(0)^2) = (1/((2 \cdot \pi)^{1/2} \cdot \sigma ivx(0))) \exp(-(x - Vix(0)a)^2/(2 \cdot \sigma ivx(0)^2)) \qquad (9)$$

Further, the current front/rear-directional position xi(0) is calculated using xi(xi(0)a,σix(0)$^2$) as a normal distribution having an average value xi(0)a of the current front/rear-directional position and a dispersion σix(0)$^2$ indicated by the deviation σix(0) of the current front/rear-directional position.

$$xi(xi(0)a, \sigma ix(0)^2) = (1/((2 \cdot \pi)^{1/2} \cdot \sigma ix(0))) \cdot \exp(-(x - xi(0)a)^2/(2 \cdot \sigma ix(0)^2)) \qquad (10)$$

Similarly, the control unit 5 assumes that each of the data including the lateral position yi of each of the three-dimensional objects to be determined, the lateral velocity Viy (differential value of lateral position yi) of each of the three-dimensional objects to be determined, and the lateral acceleration aiy (differential value of lateral velocity Viy) of each of the three-dimensional objects to be determined is output in a normal distribution whose axis is on a true value and extending in the lateral direction of the vehicle (y-axis) The control unit 5 performs statistical processing so as to calculate the current lateral acceleration aiy(0), the current lateral velocity Viy(0), and the current lateral position yi (0) of each of the three-dimensional objects to be determined in the following way. Note that $-\infty < y < \infty$ in each normal distribution described below and the dispersion of each normal distribution has a positive value.

Thus, the current lateral acceleration aiy(0) is calculated using aiy(aiy(0)a,σiay(0)$^2$) as a normal distribution having an average value aiy(0)a of the current lateral acceleration and a dispersion σiay(0)$^2$ indicated by the deviation σiay(0) of the current lateral acceleration.

$$aiy(aiy(0)a, \sigma iay(0)^2) = (1/((2 \cdot \pi)^{1/2} \cdot \sigma iay(0))) \cdot \exp(-(y - aiy(0)a)^2/(2 \cdot iay(0)^2)) \qquad (11)$$

The current lateral velocity Viy(0) is calculated using Viy(Viy(0)a,σivy(0)$^2$) as a normal distribution having an average value Viy(0)a of the current lateral velocity and a dispersion σivy(0)$^2$ indicated by the deviation σivy(0) of the current lateral velocity.

$$Viy(Viy(0)a, \sigma ivy(0)^2) = (1/((2 \cdot \pi)^{1/2} \cdot \sigma ivy(0))) \cdot \exp(-(y - Viy(0)a)^2/(2 \cdot ivy(0)^2)) \qquad (12)$$

The current lateral position yi(0) is calculated using yi(yi(0)a,σiy(0)$^2$) as a normal distribution having an average value yi(0)a of the current lateral position and a dispersion σiy(0)$^2$ indicated by the deviation σiy(0) of the current lateral position.

$$yi(yi(0)a, \sigma iy(0)^2) = (1/((2 \cdot \pi)^{1/2} \cdot \sigma iy(0))) \cdot \exp(-(y - yi(0)a)^2/(2 \cdot \sigma iy(0)^2)) \qquad (13)$$

The above dispersions σiax(0)$^2$, σivx(0)$^2$, σix(0)$^2$, σiay(0)$^2$, σivy(0)$^2$, σiy(0)$^2$ are values preset by the stereo image recognition device 4 or a recognition target object. While, in the second exemplary embodiment, the recognition result of the stereo camera is used, recognition using a millimeter wave radar has a higher velocity accuracy, which allows setting of a small dispersion.

The control unit 5 assumes and calculates the state after a preset time of Δt seconds (for example, after 0.5 seconds) as described below, based on the current front/rear-directional acceleration aix(0), the current front/rear-directional velocity Vix(0), the current front/rear-directional position xi(0), the current lateral acceleration aiy(0), the current lateral velocity Viy(0), and the current lateral position yi(0) calculated in S202.

The front/rear-directional acceleration after Δt seconds aix (Δt) is calculated using aix(aix(Δt)a,σiax(Δt)$^2$) as a normal distribution having an average value aix(Δt)a of the front/rear-directional acceleration and a dispersion σiax(Δt)$^2$ indicated by the deviation σiax(Δt) of the front/rear-directional acceleration after Δt seconds. In the second exemplary embodiment, the calculation assumes a uniform acceleration.

$$\begin{aligned} aix(\Delta t) &= aix(aix(0)a, \sigma iax(0)^2) \\ &= aix(aix(\Delta t)a, \sigma iax(\Delta t)^2) \end{aligned} \qquad (14)$$

The front/rear-directional velocity after Δt seconds Vix(Δt) is calculated using Vix(Vix(Δt)a,σivx(Δt)$^2$) as a normal distribution having an average value Vix(Δt)a of the front/rear-directional velocity after Δt seconds and a dispersion σivx (Δt)$^2$ indicated by the deviation σivx(Δt) of the front/rear-directional velocity after Δt seconds. In this case, calculation is made by using the current front/rear-directional acceleration aix(0) and the current front/rear-directional velocity Vix(0) in accordance with the expression (15).

$$\begin{aligned} Vix(\Delta t) &= Vix(Vix(0)a, \sigma ivx(0)^2) + aix(aix(0)a, \sigma iax(0)^2) \cdot \Delta t \\ &= Vix(Vix(0)a + aix(0)a \cdot \Delta t, (\sigma ivx(0) + \sigma iax(0) \cdot \Delta t)^2) \\ &= Vix(Vix(\Delta t)a, \sigma ivx(\Delta t)^2) \end{aligned} \qquad (15)$$

The front/rear-directional position after Δt seconds xi(Δt) is calculated using xi(xi(Δt)a,σix(Δt)$^2$) as a normal distribution having an average value xi(Δt)a of the front/rear-directional position and a dispersion σix(Δt)$^2$ indicated by the deviation σix(Δt) of the front/rear-directional position after Δt seconds. In this case, calculation is made by using the current front/rear-directional acceleration aix(0), the current front/rear-directional velocity Vix(0) and the current front/rear-directional position xi(0) in accordance with the expression (16).

$$xi(\Delta t) = xi(xi(0)a, \sigma ix(0)^2) + Vix(Vix(0)a, \sigma ivx(0)^2) \cdot \Delta t + \quad (16)$$
$$(1/2) \cdot aix(aix(0)a, \sigma iax(0)^2) \cdot \Delta t^2$$
$$= xi(xi(0)a + Vix(0)a \cdot \Delta t + (1/2) \cdot aix(0)a \cdot \Delta t^2,$$
$$(\sigma ix(0) + \sigma ivx(0) \cdot \Delta t + (1/2) \cdot \sigma iax(0) \cdot \Delta t^2)^2)$$
$$= xi(xi(\Delta t)a, \sigma ix(\Delta t)^2)$$

The lateral acceleration after $\Delta t$ seconds aiy($\Delta t$) is calculated using aiy(aiy($\Delta t$)a,σiay($\Delta t$)$^2$) as a normal distribution having an average value aiy($\Delta t$)a of the lateral acceleration and a dispersion σiay($\Delta t$)$^2$ indicated by the deviation σiay($\Delta t$) of the lateral acceleration after $\Delta t$ seconds. In the second exemplary embodiment, the calculation assumes a uniform acceleration.

$$aiy(\Delta t) = aiy(aiy(0)a, \sigma iay(0)^2) \quad (17)$$
$$= aiy(aiy(\Delta t)a, \sigma iay(\Delta t)^2)$$

The lateral velocity after $\Delta t$ seconds Viy($\Delta t$) is calculated using Viy(Viy($\Delta t$)a,σivy($\Delta t$)$^2$) as a normal distribution having an average value Viy($\Delta t$)a of the lateral velocity after $\Delta t$ seconds and a dispersion σivy($\Delta t$)$^2$ indicated by the deviation σivy($\Delta t$) of the lateral velocity after $\Delta t$ seconds. In this case, calculation is made by using the current lateral acceleration aiy(0) and the current lateral velocity Viy(0) in accordance with the expression (18).

$$Viy(\Delta t) = Viy(Viy(0)a, \sigma ivy(0)^2) + aiy(aiy(0)a, \sigma iay(0)^2) \cdot \Delta t \quad (18)$$
$$= Viy(Viy(0)a + aiy(0)a \cdot \Delta t, (\sigma ivy(0) + \sigma iay(0) \cdot \Delta t)^2)$$
$$= Viy(Viy(\Delta t)a, \sigma ivy(\Delta t)^2)$$

The lateral position after $\Delta t$ seconds yi($\Delta t$) is calculated using yi(yi($\Delta t$)a,σiy($\Delta t$)$^2$) as normal distribution having an average value yi($\Delta t$)a of the lateral position and a dispersion σiy($\Delta t$)$^2$ indicated by the deviation σiy($\Delta t$) of the lateral position after $\Delta t$ seconds. In this case, calculation is made by using the current lateral acceleration aiy(0), the current lateral velocity Viy(0) and the current lateral position yi(0) in accordance with the expression (19).

$$yi(\Delta t) = yi(yi(0)a, \sigma iy(0)^2) + Viy(Viy(0)a, \sigma ivy(0)^2) \cdot \Delta t + \quad (19)$$
$$(1/2) \cdot aiy(aiy(0)a, \sigma iay(0)^2) \cdot \Delta t^2$$
$$= yi(yi(0)a + Viy(0)a \cdot \Delta t + (1/2) \cdot aiy(0)a \cdot \Delta t^2,$$
$$(\sigma iy(0) + \sigma ivy(0) \cdot \Delta t + (1/2) \cdot \sigma iay(0) \cdot \Delta t^2)^2)$$
$$= yi(yi(\Delta t)a, \sigma iy(\Delta t)^2)$$

The existence probability ri(x,y,$\Delta t$) of a three-dimensional object i after $\Delta t$ seconds on a plane considering the front-rear direction (x-axis direction) and the lateral direction (y-axis direction) is calculated in accordance with the expression (20) by using the expressions (16) and (19).

$$ri=(x,y,\Delta t)=(xi(xi(\Delta t)a, \sigma ix(\Delta t)^2) \times yi(yi(\Delta t)a, \sigma iy(\Delta t)^2) \quad (20)$$

The control unit 5 calculates the probability of contact Ri($\Delta t$) with each three-dimensional object in accordance with the expression (21) based on the existence probability after $\Delta t$ seconds ri(x,y,$\Delta t$) of the three-dimensional object i obtained using the expression (20) and the position of the own vehicle 1, and keeps the current vehicle state, displays obstacle information, or performs alarm control or automatic brake control depending on the magnitude of the sum value Rt($\Delta t$) of the probabilities of contact with the three-dimensional objects arithmetically calculated using the expression (22).

$$Ri(\Delta t) = \iint (Ri(x,y,\Delta t))dxdy \quad (21)$$

(the range of integration is (front/rear-directional position of the own vehicle after $\Delta t$ seconds)<x<∞, ∞<y<(lateral position of the own vehicle after $\Delta t$ seconds)

$$Rt(\Delta t) = \Sigma i = l^n Ri(\Delta t) \quad (22)$$

Assuming that the position (xi(xi(0)a,σix(0)$^2$), yi(yi(0)a, σiy(0)$^2$) of a three-dimensional object (for example two three-dimensional objects (i=1,i=2)) on a current plane is shown as an existence probability ri(x,y,0) by normal distribution in the x-y plane as shown in FIG. 6(a), it is estimated that the three-dimensional object will be in the position with the existence probability ri(x,y,$\Delta t$/2) shown in FIG. 6(b) in $\Delta t$/2 seconds and in the position with the existence probability ri(x,y,$\Delta t$) shown in FIG. 6(c) in $\Delta t$ seconds.

As shown in FIG. 7, the sum of the contact probabilities is calculated by integrating the existence probability ri(x,y,$\Delta t$) of a three-dimensional object i to be determined with respect to the position of the own vehicle 1 and obtaining the volume of the three-dimensional object i as a probability of contact Ri($\Delta t$) with the three-dimensional object i. In case there are more than one three-dimensional objects to be determined, the sum value Rt($\Delta t$) is used as a determination criterion.

Next, a driving assistance control program according to the second exemplary embodiment executed by the vehicle driving assistance control device 2 will be described referring to the flowchart of FIG. 5.

In S201, necessary information (image information, velocity of the own vehicle V0) is loaded. In S202, the stereo image recognition device 4 extracts three-dimensional objects to be determined. In the second exemplary embodiment, a determination-target area is preset out of the image area from the stereo camera 3 and all three-dimensional objects existing in the preset area is extracted as three-dimensional objects to be determined.

Next, in S203, the control unit 5 calculates, by way of statistical processing, the current front/rear-directional acceleration aix(0), the current front/rear-directional velocity Vix (0), the current front/rear-directional position xi(0), the current lateral acceleration aiy(0), the current lateral velocity Viy(0), and the current lateral position yi(0) of each of the three-dimensional objects to be determined, by using the expressions (8), (9), (10), (11), (12) and (13).

In S204, the control unit 5 calculates, by way of statistical processing, the front/rear-directional acceleration after $\Delta t$ seconds aix($\Delta t$), the front/rear-directional velocity after $\Delta t$ seconds Vix($\Delta t$), the front/rear-directional position after $\Delta t$ seconds xi($\Delta t$), the lateral acceleration after $\Delta t$ seconds aiy ($\Delta t$), the lateral velocity after $\Delta t$ seconds Viy($\Delta t$), and the lateral position after $\Delta t$ seconds yi($\Delta t$) of each of the three-dimensional objects to be determined, by using the expressions (14), (15), (16), (17), (18) and (19).

In S205, the control unit 5 calculates the existence probability ri(x,y,$\Delta t$) of the three-dimensional object i after $\Delta t$ seconds on a plane considering the front-rear direction (x-axis direction) and the lateral direction (y-axis direction) in accordance with the expression (20) based on the front/rear-directional position xi($\Delta$t) and the lateral position yi($\Delta$t) of each of the three-dimensional objects to be determined after $\Delta$t seconds.

In S206, the control unit 5 calculates the probability of contact Ri($\Delta$t) with each of the three-dimensional objects in accordance with the expression (21) based on the existence probability after $\Delta$t seconds ri(x,y,$\Delta$t) of each of the three-dimensional objects i.

In S207, the control unit 5 calculates the sum value Rt($\Delta$t) of the probabilities of contact with all the three-dimensional objects in accordance with the expression (22).

In S208, the control unit 5 determines whether the sum value Rt($\Delta$t) of the probabilities of contact with all the three-dimensional objects is 0.20 or more. In case the sum value Rt($\Delta$t) is 0.20 or more, execution proceeds to S209, where a deceleration signal is output to an automatic brake control device 8 to operate certain automatic braking and the program is exited.

In case the sum value Rt($\Delta$t) of the probabilities of contact with all the three-dimensional objects is less than 0.20 as a result of determination in S208, execution proceeds to S210, where it is determined whether the sum value Rt($\Delta$t) of the probabilities of contact with all the three-dimensional objects is 0.10 or more.

In case the sum value Rt($\Delta$t) of the probabilities of contact with all the three-dimensional objects is 0.10 or more as a result of determination in S210, execution proceeds to S211, where a voice alarm is issued from a loudspeaker 7 and the program is exited.

In case the sum value Rt($\Delta$t) of the probabilities of contact with all the three-dimensional objects is less than 0.10 as a result of determination in S210, execution proceeds to S212, where it is determined whether the sum value Rt($\Delta$t) of the probabilities of contact with all the three-dimensional objects is 0.05 or more.

In case the sum value Rt($\Delta$t) of the probabilities of contact with all the three-dimensional objects is 0.05 or more as a result of determination in S212, execution proceeds to S213, where the driver is provided with corresponding information through a monitor 6 and the program is exited. In case sum value Rt($\Delta$t) is less than 0.05, the program is exited without notifying the driver.

In this way, according to the second exemplary embodiment, the current front/rear-directional acceleration aix(0), the current front/rear-directional velocity Vix(0), the current front/rear-directional position xi(0), the current lateral acceleration aiy(0), the current lateral velocity Viy(0), and the current lateral position yi(0) of each of the three-dimensional objects to be determined are calculated by way of statistical processing while considering an error caused by a camera. These values are used in statistical processing to obtain the front/rear-directional acceleration after $\Delta$t seconds aix($\Delta$t), the front/rear-directional velocity after $\Delta$t seconds Vix($\Delta$t), the front/rear-directional position after $\Delta$t seconds xi($\Delta$t), the lateral acceleration after $\Delta$t seconds aiy($\Delta$t), the lateral velocity after $\Delta$t seconds Viy($\Delta$t), and the lateral position after $\Delta$t seconds yi($\Delta$t). Then, the existence probability after $\Delta$t seconds ri(x,y,$\Delta$t) is calculated. Depending on the magnitude of the value of the sum value Rt($\Delta$t) of these contact probabilities, control such as notification by an alarm is made. It is thus possible to statistically consider and estimate the possibility of a three-dimensional object ahead coming in contact with the own vehicle 1 without correctly obtaining the position of the three-dimensional object in a wide area where all three-dimensional objects on a plane in front of the own vehicle are determined, thereby utilizing the calculation result for control with a natural feel.

While a preceding vehicle is recognized based on an image from a stereo camera in the first and second exemplary embodiments, any other technique may be used. For example, information from a millimeter wave radar and a single-lens camera may be used instead.

Figure 8:
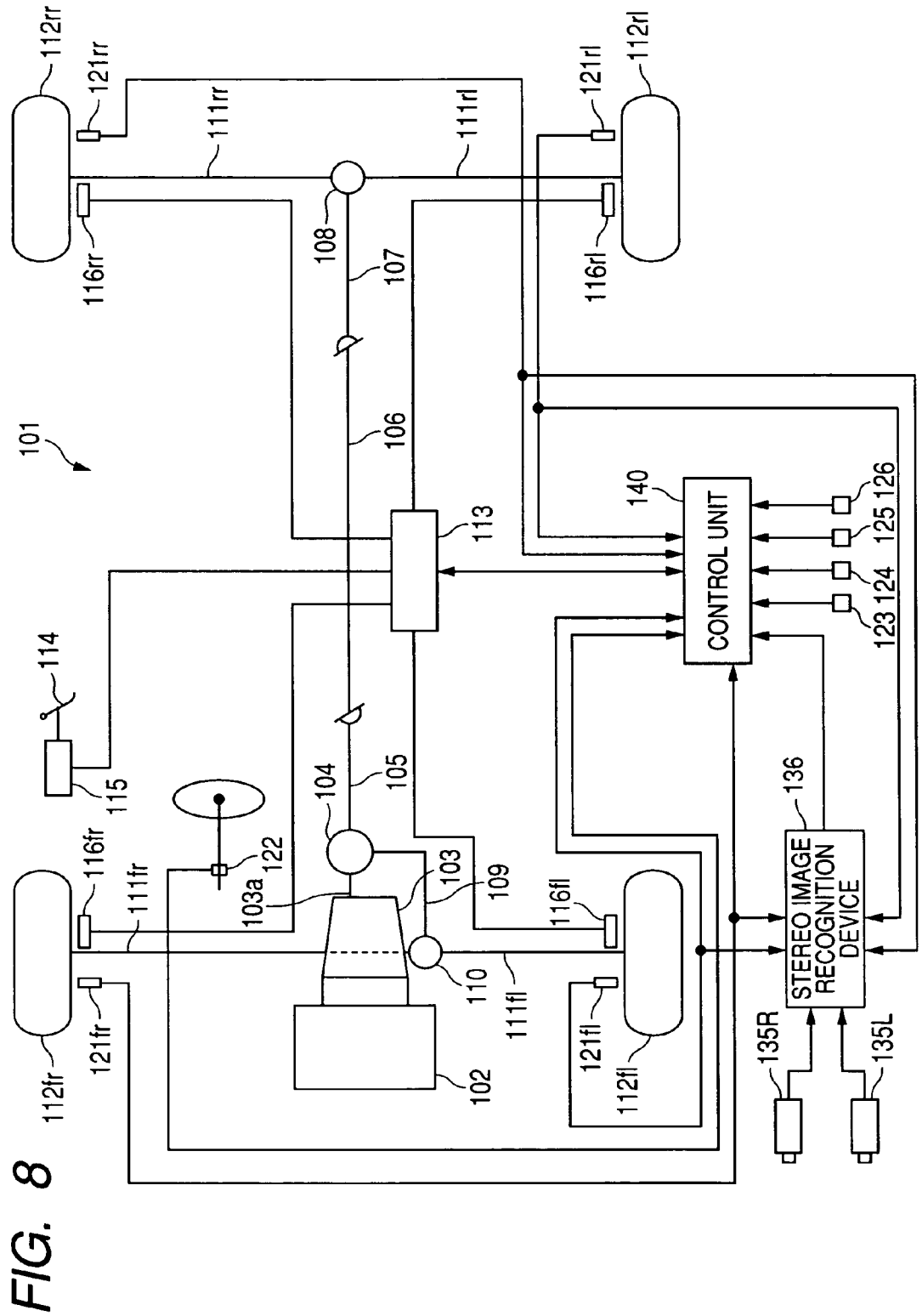
FIG. 8 is a general block diagram of a driving assistance control device mounted on a vehicle according to a third exemplary embodiment.
Figure 9:
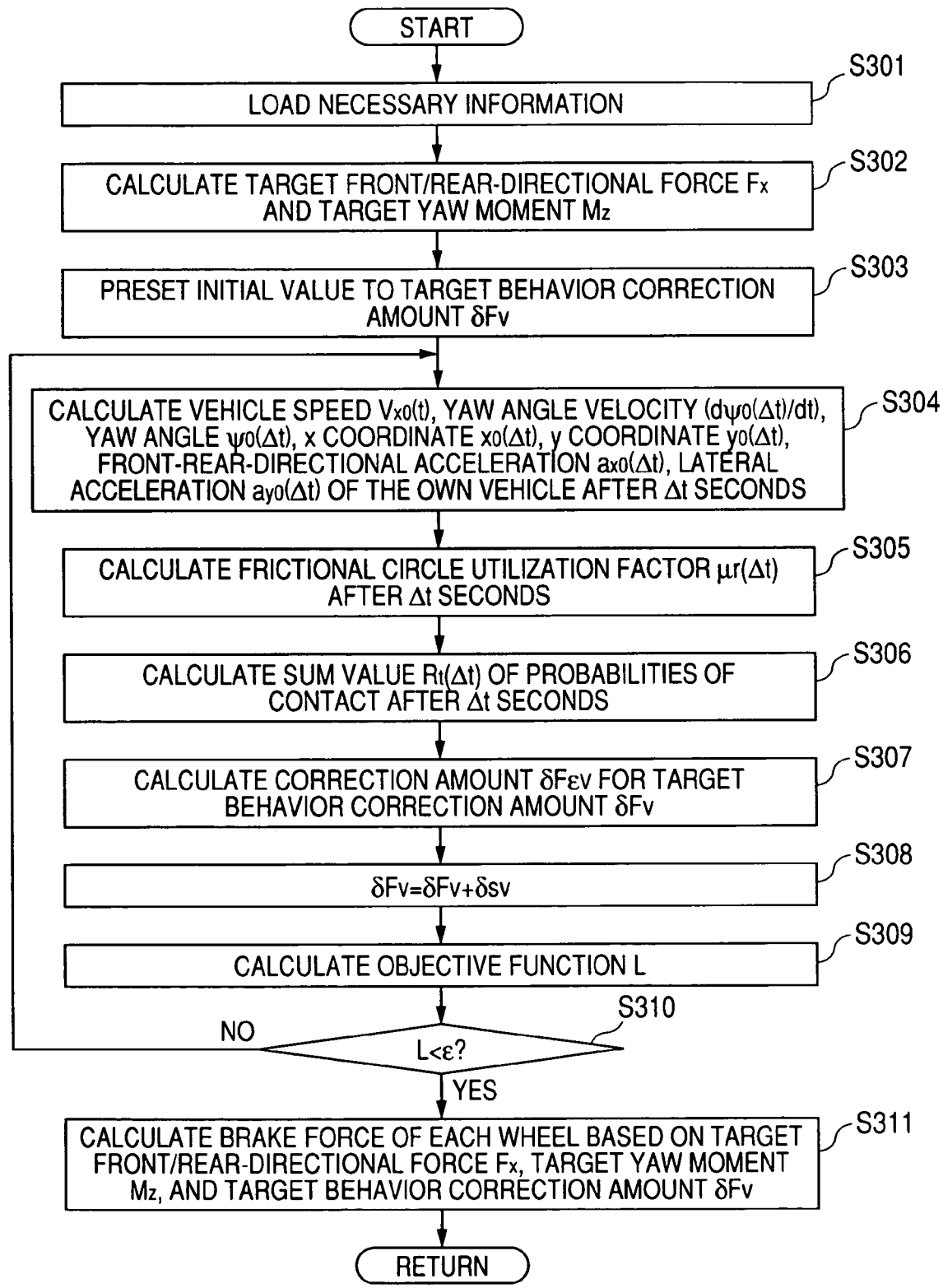
FIG. 9 is a flowchart of a driving assistance control program according to the third exemplary embodiment.
Figure 10:
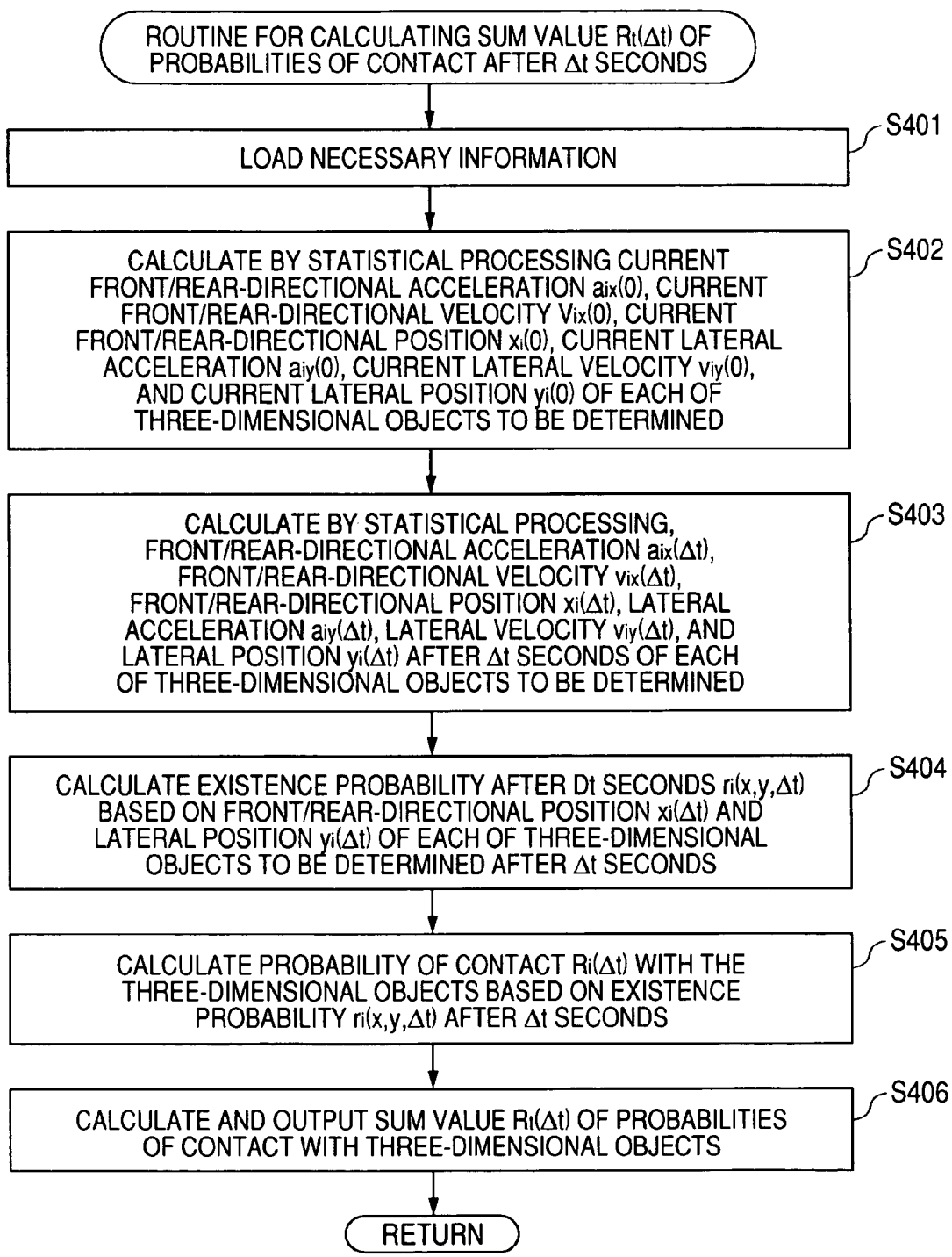
FIG. 10 is a flowchart of a routine for calculating the sum value Rt(Δt) of the probabilities of contact after Δt seconds.
Figure 11A:
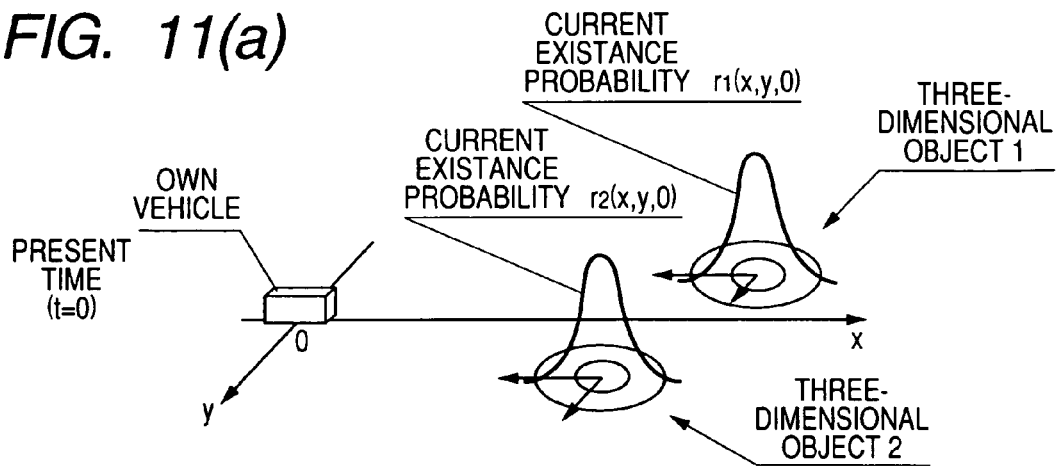
FIGS. 11(a) to 11(c) explain statistical positions of three-dimensional objects to be determined from the present time to Δt seconds later.
Figure 11B:
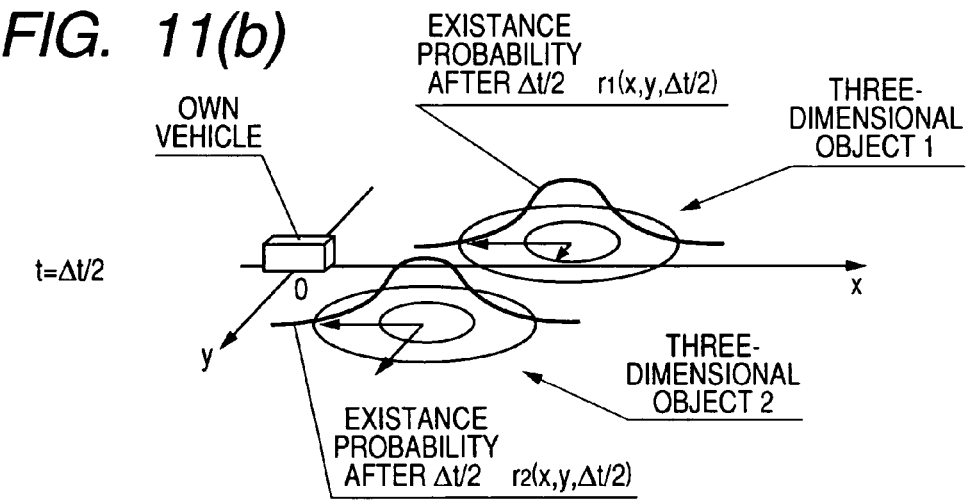
Figure 11C:
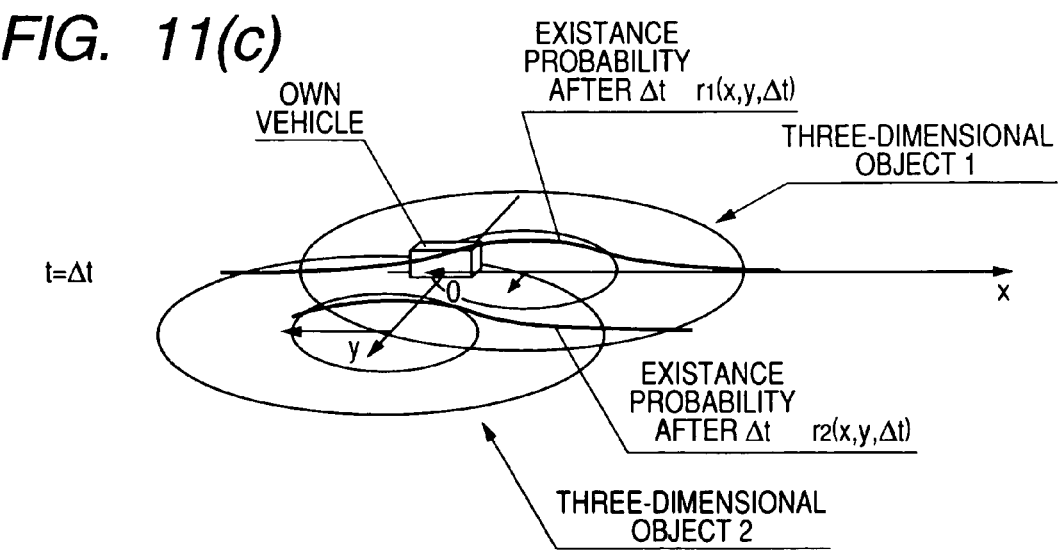
Figure 12:
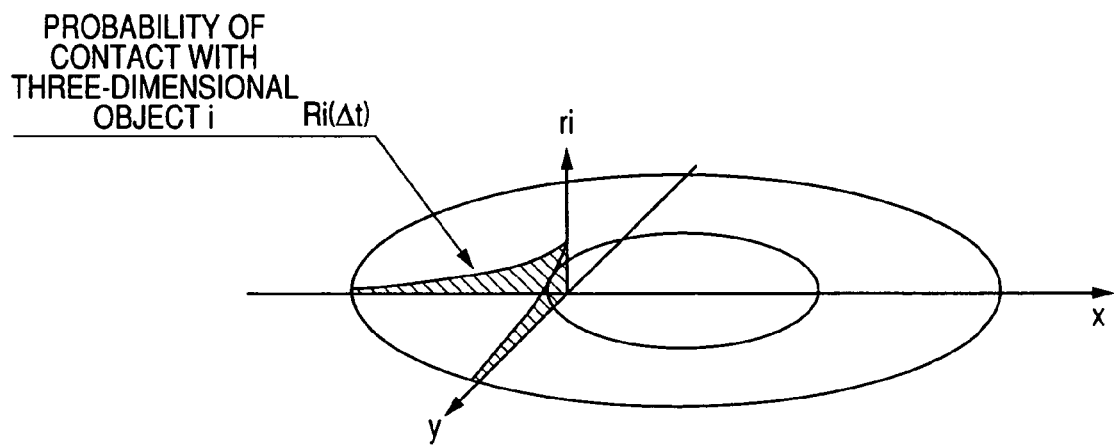
FIG. 12 explains the probability of contact.

FIGS. 8 through 12 show a third exemplary embodiment of the invention. FIG. 8 is a general block diagram of a driving assistance control device mounted on a vehicle. FIG. 9 is a flowchart of a driving assistance control program. FIG. 10 is a flowchart of a routine for calculating the sum value Rt($\Delta$t) of the probabilities of contact after $\Delta$t seconds. FIGS. 11(a) to 11(c) explains the statistical position of a three-dimensional object to be determined from the present time to $\Delta$t seconds later. FIG. 12 explains the probability of contact.

In FIG. 8, a numeral 101 shows a vehicle an example of which is a four-wheel drive vehicle including a center-differential device and an automatic gear. The driving force by an engine 102 arranged at the vehicle front is transmitted from the automatic gear (including a torque converter shown in the figure) 103 in the rear of the engine 102 via a transmission output axle 103a to a center differential device 104. The driving force is input from the center differential device 104 to a rear wheel final reduction gear 108 via a rear driving axle 105, a propeller shaft 106 and a drive pinion 107 and from the center differential device 104 to a front wheel final reduction gear 110 via a front driving axle 109. The automatic gear 103, the center differential device 104 and the front wheel final reduction gear 110 are integrally provided in a housing (not shown).

The driving force input to the rear wheel final reduction gear 108 is transmitted to a left rear wheel 112rl via a rear wheel left driving axle 111rl and to a right rear wheel 112rr via a rear wheel right driving axle 111rr. The driving force input to the front wheel final reduction gear 110 is transmitted to a left front wheel 112fl via a front wheel left driving axle 111fl and to a right front wheel 112fr via a front wheel right driving axle 111fr.

A numeral 113 represents the brake driving part of the vehicle. To the brake driving part 113 is connected a master cylinder 115 coupled to a brake pedal 114 operated by a driver. When the driver operates the brake pedal 114, the master cylinder 115 introduces a brake pressure into the wheel cylinders (a front left wheel cylinder 116fl, a front right wheel cylinder 116fr, a rear left wheel cylinder 116rl, a rear right wheel cylinder 116rr) of the four wheels 112fl, 112fr, 112rl and 112rr via the brake driving part 113. This brakes the four wheels.

The brake driving part 113 is a hydraulic unit including a pressuring source, a pressure reducing valve and a pressure intensifying valve. The brake driving part 113 is designed so as to independently introduce brake pressures into the wheel cylinders 116fl, 116fr, 116rl, 116rr in accordance with an input signal from the control unit 140 of a vehicle behavior control device described later.

The vehicle 101 is provided with a pair of (left/right) CCD cameras 135L, 135R using a solid-state imaging device such as a charge-coupled device (CCD) as a stereo optical system. The left and right CCD cameras 135L, 135R are respectively mounted in the front area of the ceiling of the cabin with a preset spacing and perform stereophonic imaging of an object outside the vehicle from different viewpoints and output image signals to a stereo image recognition device 136 described later.

The stereo image recognition device 136 receives image signals from the CCD cameras 135L, 135R and vehicle velocities ωfl, ωfr, ωrl, ωrr from the wheel velocity sensors 121fl, 121fr, 121rl, 121rr. The stereo image recognition device 136 calculates an average of these velocities so as to calculate the velocity of the own vehicle Vxo(0).

The stereo image recognition device 136 detects forward information including the three-dimensional data and white line data ahead of the own vehicle 101 to estimate the travel path of the own vehicle 101 (own vehicle travel path). The stereo image recognition device 136 presets a determination-target area out of the image area from the CCD cameras 135L, 135R and extracts a three-dimensional object existing in the preset area to be determined. On this occasion, the identification number i of each three-dimensional object extracted to be determined is 1 to n (hereinafter a sign "i" is the number pertaining to each three-dimensional object). The three-dimensional object to be determined may be the nearest three-dimensional object or n three-dimensional objects located in the nearest position in the preset area. The data output to a control unit 140 includes a distance xi to each of the three-dimensional objects to be determined, a lateral position yi of each of the three-dimensional objects to be determined whose center coordinate axis is the travel path of the own vehicle, a front/rear-directional velocity Vix (differential value of distance xi+velocity of own vehicle Vxo(0)) of each of the three-dimensional objects to be determined, a lateral velocity Viy (differential value of lateral position yi) of each of the three-dimensional objects to be determined, a front/rear-directional acceleration aix (differential value of front/rear-directional velocity Vix) of each of the three-dimensional objects to be determined, and a lateral acceleration aiy (differential value of lateral velocity Viy) of each of the three-dimensional objects to be determined extracted as described above.

Processing of an image from the CCD cameras 135L, 135R by the stereo image recognition device 136 is made for example in the following way. Distance information is obtained using the deviation amount between corresponding positions through the triangulation technique from a stereo image ahead of the own vehicle 101 photographed with the CCD cameras 135L, 135R. The data undergoes well-known grouping processing, or is compared with pre-stored three-dimensional road shape data and three-dimensional object data to extract three-dimensional object data including white line data, side wall data such as data of a guardrail and a curb along the road, and data of a vehicle or a pedestrian. The three-dimensional object data is used to obtain the distance to the three-dimensional object and the temporal change of the distance (relative velocity with respect to the own vehicle 1) and extract all three-dimensional objects existing in the preset area as three-dimensional objects to be determined (object to be determined). In this way, the CCD cameras 135L, 135R and the stereo image recognition device 136 are provided as three-dimensional object information detection means and determination object selection means.

The control unit 140 receives from the stereo image recognition device 136 the data including the distance xi to each of the three-dimensional objects to be determined, the lateral position yi of each of the three-dimensional objects to be determined whose center coordinate axis is the travel path of the own vehicle, the front/rear-directional velocity Vix (differential value of distance xi+velocity of own vehicle Vxo(0)) of each of the three-dimensional objects to be determined, the lateral velocity Viy (differential value of lateral position yi) of each of the three-dimensional objects to be determined, the front/rear-directional acceleration aix (differential value of front/rear-directional velocity Vix) of each of the three-di-mensional objects to be determined, and the lateral acceleration aiy (differentia value of lateral velocity Viy) of each of the three-dimensional objects to be determined.

The own vehicle 101 includes the wheel velocity sensors 121fl, 121fr, 121rl, 121rr, a steering wheel angle sensor 122 for detecting a steering wheel angle θH, an accelerator opening sensor 123 for detecting the accelerator opening θa, a brake pedal sensor 124 for detecting the depression amount of a brake pedal 114 as a brake pedal opening θb, a yaw rate sensor 125 for detecting a yaw angle velocity (dφ(0)/dt), and a front/rear-directional acceleration sensor 126 for detecting a front/rear-directional acceleration axo(0). Signals from these sensors 121fl, 121fr, 121rl, 121rr, 122, 123, 124, 125 and 126 are input to the control unit 140.

The control unit 140 performs vehicle behavior control in accordance with a vehicle behavior control program described later based on these input signals. Specific calculations will be detailed in the program description given later. Roughly speaking, a target behavior (target front/rear-directional force Fx, target yaw moment Mz) estimated from the driver operation of the own vehicle 101 is calculated. The control unit 140 presets an objective function L that includes the frictional circle utilization factor μr (Δt) of the own vehicle 101 after Δt seconds as a preset time (for example 0.5 seconds), the sum value Rt(Δt) of the probabilities of contact with all the three-dimensional objects as determination objects, and the correction amount of target behavior δFv (the suffix v indicates a vector amount) and provides a minimum value. The control unit 140 then calculates a target behavior correction amount δFv where the objective function takes the minimum value. A control amount is determined based on the target behavior and the target behavior correction amount δFv. The control amount thus obtained is used to execute automatic brake control as an example of an actuator for specific vehicle behavior control. In this way, the control unit 140 serves as target behavior calculation means, determination object current state processing means, determination object state estimation means, contact probability calculation means, target behavior correction amount calculation means, control means, and frictional circle utilization factor calculation means.

Next, the vehicle behavior control program executed by the control unit 140 will be described referring to the flow chart of FIG. 8.

In step 301 (S301), necessary information, that is, wheel velocities ωfl, ωfr, ωrl, ωrr, a steering wheel angle θH, an accelerator opening θa, a brake pedal opening θb, a yaw angle velocity (dφO(0)/dt) and a front/rear-directional acceleration a xo(0) are loaded.

In S302, the target front/rear-directional force Fx is calculated using the expression (101) or (102).

When the accelerator opening θa≧0, $$Fx = K\theta a \cdot \theta a + Kd\theta a \cdot (d\theta a/dt) \quad (101)$$

where Kθa is a preset proportional term gain and Kdθa is a preset differential term gain.

When the accelerator opening θa<0, $$Fx = -K\theta b \cdot \theta b - Kd\theta b \cdot (d\theta b/dt) \quad (102)$$

where Kθb is a preset proportional term gain and Kdθb is a preset differential term gain.

The target yaw moment Mz is calculated using the expression (103).

$$Mz = b2 \cdot ((\theta H/ns) + Kd\theta H \cdot (d\theta H/dt)) - a22 \cdot \phi o(0) \quad (103)$$

where ns is a steering gear ratio and KdθH is a preset constant.

b2 is calculated using the expression (104) and a22 is calculated using the expression (105).

$$b2 = (2 \cdot Lf \cdot Kf)/Iz \quad (104)$$

$$a22 = (2/Vxo)0)) \cdot ((Lf^2 \cdot Kf + Lr^2 \cdot Kr)/Iz) \quad (105)$$

where Lf is a front axle-barycenter distance, Lr is a rear axle-barycenter distance, Kf is the cornering power of a front wheel, Kr is the cornering power of a rear wheel, and Iz is a moment of inertia. Vxo(0) is the velocity of an own vehicle obtained by calculating the average of the wheel velocities ωfl, ωfr, ωrl, ωrr.

In S303, an initial value is set to the target behavior correction amount δFv.

$$\delta Fv = \left\{ \begin{array}{c} \delta Fx \\ \delta Mz \end{array} \right\} = \left\{ \begin{array}{c} 0 \\ 0 \end{array} \right\} \quad (106)$$

where δFx is a correction amount of a target front/rear-directional force and δMz is a correction amount of a target yaw moment.

In S304, the velocity of the own vehicle after Δt seconds Vxo(Δt), a yaw angle velocity (dφo(Δt)/dt), a yaw angle φo(Δt), an x coordinate xo(Δt), a y coordinate yo(Δt), a front/rear-directional acceleration axo(Δt), and a lateral acceleration ayo(Δt) are calculated using the expressions (107) through (113).

$$Vxo(\Delta t) = Vxo(0) + (axo(0) + (Fx + \delta Fx)/m) \cdot \Delta t \quad (107)$$

where m is a vehicle weight.

$$(d\phi o(\Delta t)/dt) = \quad (108)$$
$$(d\phi o(0)/dt) + (d^2 \phi o(0)/dt^2) + (Mz + \delta Mz)/Iz) \cdot \Delta t$$

Assuming that the vehicle is traveling at a middle to high speed and the vehicle body sliding angle is sufficiently small, $$\phi o(\Delta t) = (d\phi o(0)/dt) \cdot \Delta t + \quad (109)$$
$$(1/2) \cdot ((d^2 \phi o(0)/dt^2) + (Mz + \delta Mz)/Iz) \cdot \Delta t^2$$

$$xo(\Delta t) = \int (Vxo(t) \cdot \cos(\phi o(t))dt \quad (110)$$

(where the integration range is from t=0 to t=Δt)

$$yo(\Delta t) = \int (Vxo(t) \cdot \sin(\phi o(t))dt \quad (111)$$

(where the integration range is from t=0 to t=Δt)

$$axo(\Delta t) = axo(0) + (Fx + \delta Fx)/m \quad (112)$$

$$ayo(\Delta t) = Vxo(\Delta t) \cdot (d\phi o(\Delta t)/dt) \quad (113)$$

Next, in S305, the frictional circle utilization factor after Δt seconds μr (Δt) is calculated by way of the expression (14) by using the maximum static friction coefficient μmax (preset value) based on the expressions (112) and (113).

$$\mu r(\Delta t) = (axo(\Delta t)^2 + ayo(\Delta t)^2)1/2/(\mu max \cdot g) \quad (114)$$

where g is a gravitational acceleration.

Next, in S306, the sum value Rt(Δt) of the probability of contact after Δt seconds is calculated. This calculation is made in accordance with the flowchart of FIG. 10.

In S401, necessary information, that is, the data including the distance xi to each of the three-dimensional objects to be determined, the lateral position yi of each of the three-dimensional objects to be determined whose center coordinate axis is the travel path of the own vehicle, the front/rear-directional velocity Vix (differential value of distance xi+velocity of own vehicle Vxo(0)) of each of the three-dimensional objects to be determined, the lateral velocity Viy (differential value of lateral position yi) of each of the three-dimensional objects to be determined, the front/rear-directional acceleration aix (differential value of front/rear-directional velocity Vix) of each of the three-dimensional objects to be determined, and the lateral acceleration aiy (differentia value of lateral velocity Viy) of each of the three-dimensional objects to be determined is loaded from the stereo image recognition device 136.

Next, in S402, the control unit 140 calculates, by way of statistical processing, the current front/rear-directional acceleration aix(0), the current front/rear-directional velocity Vix (0), the current front/rear-directional position xi(0), the current lateral acceleration aiy(0), the current lateral velocity Viy(0), and the current lateral position yi(0) of each of the three-dimensional objects to be determined, by using the expressions (115), (116), (117), (118), (119) and (120) given below.

That is, the control unit 140 assumes that each of the data including the distance xi to each of the three-dimensional objects to be determined, the front/rear-directional velocity Vix ((distance x+velocity of the own vehicle Vxo(0)) of each of the three-dimensional objects to be determined, and the front/rear-directional acceleration aix (differential value of front/rear-directional velocity Vix) of each of the three-dimensional objects to be determined is output in a normal distribution whose axis is on a true value and extending in the front/rear-direction of the vehicle (x-axis). The control unit 140 performs statistical processing to calculate the current front/rear-directional acceleration aix(0), the current front/rear-directional velocity Vix(0), and the current front/rear-directional position xi(0) of each of the three-dimensional objects to be determined in the following way. Note that −∞<x<∞ in each normal distribution described below and the dispersion of each normal distribution is a positive value.

Thus, the current front/rear-directional acceleration aix(0) is calculated using aix(aix(0)a, σiax(0)²) as a normal distribution having an average value aix(0)a of the current front/rear-directional acceleration and a dispersion σiax(0)² indicated by the deviation σiax(0) of the current front/rear-directional acceleration.

$$aix(aix(0)a, \sigma iax(0)^2) = (1/((2 \cdot \pi)^{1/2} \cdot \sigma iax(0))) \cdot \exp(-(x - aix(0)a)^2/(2 \cdot \sigma iax(0)^2)) \quad (115)$$

The current front/rear-directional velocity Vix(0) is calculated using Vix(Vix(0)a, vivx(0)²) as a normal distribution having an average value Vix(0)a of the current front/rear-directional velocity and a dispersion vivx(0)² indicated by the deviation σivx(0) of the current front/rear-directional velocity.

$$Vix(Vix(0)a, \sigma ivx(0)^2) = (1/((2 \cdot \pi)^{1/2} \cdot ivx(0))) \cdot \exp(-(x - Vix(0)a)^2/(2 \cdot \sigma ivx(0)^2)) \quad (116)$$

The current front/rear-directional position xi(0) is calculated using xi(xi(0)a, σix(0)²) as a normal distribution having an average value xi(0)a of the current front/rear-directional position and a dispersion σix(0)² indicated by the deviation σix(0) of the current front/rear-directional position.

$$xi(xi(0)a,\sigma ix(0)^2)=(1/((2\cdot\pi)^{1/2}\cdot\sigma ix(0)))\cdot\exp(-(x-xi(0)a)^2/(2\cdot\sigma ix(0)^2)) \quad (117)$$

Similarly, the control unit 140 assumes that each of the data including the lateral position yi of each of the three-dimensional objects to be determined, the lateral velocity Viy (differential value of lateral position yi) of each of the three-dimensional objects to be determined, and the lateral acceleration aiy (differential value of lateral velocity Viy) of each of the three-dimensional objects to be determined is output in a normal distribution whose axis is on a true value and extending in the lateral direction of the vehicle (y-axis) The control unit 140 performs statistical processing to calculate the current lateral acceleration aiy(0), the current lateral velocity Viy(0), and the current lateral position yi (0) of each of the three-dimensional objects to be determined in the following way. Note that $-\infty < y < \infty$ in each normal distribution described below and the dispersion of each normal distribution has a positive value.

Thus, the current lateral acceleration aiy (0) is calculated using aiy(aiy(0)a,$\sigma$iay(0)$^2$) as normal distribution having an average value aiy(0)a of the current lateral acceleration and a dispersion $\sigma$iay(0)$^2$ indicated by the deviation $\sigma$iay(0) of the current lateral acceleration.

$$aiy(aiy(0)a,\sigma iay(0)^2)=(1/((2\cdot\pi)^{1/2}\cdot iay(0)))\cdot\exp(-(y-aiy(0)a)^2/(2\cdot\sigma iay(0)^2)) \quad (118)$$

The current lateral velocity Viy(0) is calculated using Viy (Viy(0)a,$\sigma$ivy(0)$^2$) as a normal distribution having an average value Viy(0)a of the current lateral velocity and a dispersion $\sigma$ivy(0)$^2$ indicated by the deviation $\sigma$ivy(0) of the current lateral velocity.

$$Viy(Viy(0)a,\sigma ivy(0)^2)=(1/((2\cdot\pi)^{1/2}\cdot\sigma ivy(0)))\cdot\exp(-(y-Viy(0)a)^2/(2\cdot\sigma ivy(0)^2)) \quad (119)$$

The current lateral position yi(0) is calculated using yi(yi (0)a,$\sigma$iy(0)$^2$) as normal distribution having an average value yi(0)a of the current lateral position and a dispersion $\sigma$iy(0)$^2$ indicated by the deviation $\sigma$iy(0) of the current lateral position.

$$yi(yi(0)a,\sigma iy(0)^2)=(1/((2\cdot\pi)^{1/2}\cdot\sigma iy(0)))\cdot\exp(-(y-yi(0)a)^2/(2\cdot\sigma iy(0)^2)) \quad (120)$$

The above dispersions $\sigma$iax(0)$^2$, ivx(0)$^2$, $\sigma$ix(0)$^2$, $\sigma$iay(0)$^2$, $\sigma$ivy(0)$^2$, $\sigma$iy(0)$^2$ are values preset by the stereo image recognition device 36 or a recognition target object. While in this embodiment the recognition results of the CCD cameras 135L, 135R are used, recognition using a millimeter wave radar has a higher velocity accuracy, which allows setting of a small dispersion.

In S403, the control unit 140 calculates, by way of statistical processing, the front/rear-directional acceleration after $\Delta$t seconds aix($\Delta$t), the front/rear-directional velocity after $\Delta$t seconds Vix($\Delta$t), the front/rear-directional position after $\Delta$t seconds xi($\Delta$t), the lateral acceleration after $\Delta$t seconds aiy ($\Delta$t), the lateral velocity after $\Delta$t seconds Viy($\Delta$t), and the lateral position after $\Delta$t seconds yi($\Delta$t) of each of the three-dimensional objects to be determined, by using the expressions (121), (122), (123), (124), (125) and (126) given below.

The control unit 140 assumes and calculates the state after a preset time of $\Delta$t seconds as described below, based on the current front/rear-directional acceleration aix(0), the current front/rear-directional velocity Vix(0), the current front/rear-directional position xi(0), the current lateral acceleration aiy (0), the current lateral velocity Viy(0), and the current lateral position yi(0) calculated in S402.

The front/rear-directional acceleration after $\Delta$t seconds aix ($\Delta$t) is calculated using aix(aix($\Delta$t)a,$\sigma$iax($\Delta$t)$^2$) as a normal distribution having an average value aix($\Delta$t)a of the front/rear-directional acceleration and a dispersion $\sigma$iax($\Delta$t)$^2$ indicated by the deviation $\sigma$iax($\Delta$t) of the front/rear-directional acceleration after $\Delta$t seconds. In this embodiment, calculation assumes a uniform acceleration.

$$\begin{aligned} aix(\Delta t) &= aix(aix(0)\,a, \sigma iax(0)^2) \\ &= aix(aix(\Delta t)\,a, \sigma iax(\Delta t)^2) \end{aligned} \quad (121)$$

The front/rear-directional velocity after $\Delta$t seconds Vix($\Delta$t) is calculated using Vix(Vix($\Delta$t)a,$\sigma$ivx($\Delta$t)$^2$) as a normal distribution having an average value Vix($\Delta$t)a of the front/rear-directional velocity after $\Delta$t seconds and a dispersion $\sigma$ivx ($\Delta$t)$^2$ indicated by the deviation $\sigma$ivx($\Delta$t) of the front/rear-directional velocity after $\Delta$t seconds. In this case, calculation is made by using the current front/rear-directional acceleration aix(0) and the current front/rear-directional velocity Vix (0) in accordance with the expression (122).

$$\begin{aligned} Vix(\Delta t) &= Vix(Vix(0)\,a, \sigma ivx(0)^2) + aix(aix(0)\,a, \sigma iax(0)^2)\cdot\Delta t \\ &= Vix(Vix(0)\,a + aix(0)\,a\cdot\Delta t, (\sigma ivx(0) + \sigma iax(0)\cdot\Delta t)^2) \\ &= Vix(Vix(\Delta t)\,a, \sigma ivx(\Delta t)^2) \end{aligned} \quad (122)$$

The front/rear-directional position after $\Delta$t seconds xi($\Delta$t) is calculated using xi(xi($\Delta$t)a,$\sigma$ix($\Delta$t)$^2$) as a normal distribution having an average value xi($\Delta$t)a of the front/rear-directional position and a dispersion $\sigma$ix($\Delta$t)$^2$ indicated by the deviation $\sigma$ix($\Delta$t) of the front/rear-directional position after $\Delta$t seconds. In this case, calculation is made by using the current front/rear-directional acceleration aix(0), the current front/rear-directional velocity Vix(0) and the current front/rear-directional position xi(0) in accordance with the expression (123).

$$\begin{aligned} xi(\Delta t) &= xi(xi(0)\,a, \sigma ix(0)^2) + \\ &\quad Vix(Vix(0)\,a, \sigma ivx(0)^2)\cdot\Delta t + \\ &\quad (1/2)\cdot aix(aix(0)\,a, \sigma iax(0)^2)\cdot\Delta t^2 \\ &= xi(xi(0)\,a + Vix(0)\,a\cdot\Delta t + (1/2)\cdot aix(0)\,a\cdot\Delta t^2, \\ &\quad (\sigma ix(0) + \sigma ivx(0)\cdot\Delta t + (1/2)\cdot\sigma iax(0)\cdot\Delta t^2)^2) \\ &= xi(xi(\Delta t)\,a, \sigma ix(\Delta t)^2) \end{aligned} \quad (123)$$

The lateral acceleration after $\Delta$t seconds aiy($\Delta$t) is calculated using aiy(aiy($\Delta$t)a,$\sigma$iay($\Delta$t)$^2$) as a normal distribution having an average value aiy($\Delta$t)a of the lateral acceleration and a dispersion $\sigma$iay($\Delta$t)$^2$ indicated by the deviation $\sigma$iay($\Delta$t) of the lateral acceleration after $\Delta$t seconds. In this exemplary embodiment, the calculation assumes a uniform acceleration.

$$\begin{aligned} aiy(\Delta t) &= aiy(aiy(0)\,a, \sigma iay(0)^2) \\ &= aiy(aiy(\Delta t)\,a, \sigma iay(\Delta t)^2) \end{aligned} \quad (124)$$

The lateral velocity after $\Delta$t seconds Viy($\Delta$t) is calculated using Viy(Viy($\Delta$t)a,$\sigma$ivy($\Delta$t)$^2$) as a normal distribution having an average value Viy($\Delta$t)a of the lateral velocity after $\Delta$t seconds and a dispersion $\sigma$ivy($\Delta$t)$^2$ indicated by the deviation $\sigma$ivy($\Delta$t) of the lateral velocity after $\Delta$t seconds. In this case, calculation is made by using the current lateral acceleration aiy(0) and the current lateral velocity Viy(0) in accordance with the expression (125).

$$Viy(\Delta t) = Viy(Viy(0) a, \sigma ivy(0)^2) + aiy(aiy(0) a, \sigma iay(0)^2) \cdot \Delta t \quad (125)$$
$$= Viy(Viy(0) a + aiy(0) a \cdot \Delta t, (\sigma ivy(0) + \sigma iay(0) \cdot \Delta t)^2)$$
$$= Viy(Viy(\Delta t) a, \sigma ivy(\Delta t)^2)$$

The lateral position after $\Delta t$ seconds $yi(\Delta t)$ is calculated using $yi(yi(\Delta t)a, \sigma iy(\Delta t)^2)$ as normal distribution having an average value $yi(\Delta t)$ a of the lateral position and a dispersion $\sigma iy(\Delta t)^2$ indicated by the deviation $\sigma iy(\Delta t)$ of the lateral position after $\Delta t$ seconds. In this case, calculation is made by using the current lateral acceleration aiy(0), the current lateral velocity Viy(0) and the current lateral position yi(0) in accordance with the expression (126).

$$yi(\Delta t) = yi(yi(0) a, \sigma iy(0)^2) + \quad (126)$$
$$Viy(Viy(0) a, \sigma ivy(0)^2) \cdot \Delta t +$$
$$(1/2) \cdot aiy(aiy(0) a, \sigma iay(0)^2) \cdot \Delta t^2$$
$$= yi(yi(0) a + Viy(0) a \cdot \Delta t + (1/2) \cdot aiy(0) a \cdot \Delta t^2,$$
$$(\sigma iy(0) + \sigma ivy(0) \cdot \Delta t + (1/2) \cdot \sigma iay(0) \cdot \Delta t^2)^2)$$
$$= yi(yi(\Delta t) a, \sigma iy(\Delta t)^2)$$

In S404, the control unit 140 calculates the existence probability $ri(x,y,\Delta t)$ of the three-dimensional object i after $\Delta t$ seconds on a plane considering the front-rear direction (x-axis direction) and the lateral direction (y-axis direction) in accordance with the expression (127) based on the front/rear-directional position $xi(\Delta t)$ and the lateral position $yi(\Delta t)$ of each of the three-dimensional objects to be determined after $\Delta t$ seconds.

The existence probability $ri(x,y,\Delta t)$ of a three-dimensional object i after $\Delta t$ seconds on a plane considering the front-rear direction (x-axis direction) and the lateral direction (y-axis direction) is calculated in accordance with the expression (127) by using the expressions (123) and (126).

$$ri=(x,y\Delta t)=xi(xi(\Delta t)a, \sigma ix(\Delta t)^2) \times yi(yi(\Delta t)a, \sigma iy(\Delta t)^2) \quad (127)$$

In S405, the control unit 40 calculates the probability of contact $Ri(\Delta t)$ with each of the three-dimensional objects in accordance with the expression (128) based on the existence probability $ri(x,y,\Delta t)$ after $\Delta t$ seconds of each of the three-dimensional objects i.

The control unit 140 calculates the probability of contact $Ri(\Delta t)$ with each three-dimensional object in accordance with the expression (128) based on the existence probability $ri(x,y,\Delta t)$ of the three-dimensional object i to be determined obtained using the expression (127) and the position of the own vehicle 101.

$$R1(\Delta t)=\iint (Ri(x,y,\Delta t))dxdy \quad (128)$$

(the range of integration is (front/rear-directional position of position of the own vehicle after $\Delta t$ seconds)$<x<\infty$, $-\infty<y<$(lateral position of the own vehicle after $\Delta t$ seconds)

In S406, the control unit 140 calculates the sum value $Rt(\Delta t)$ of the probabilities of contact with all the three-dimensional objects in accordance with the expression (129).

$$Rt(\Delta t)=\Sigma i=1^n Ri(\Delta t) \quad (129)$$

Assuming that the position $(xi(xi(0)a, \sigma ix(0)^2), (yi(yi(0)a, \sigma iy(0)^2)$ of a three-dimensional object (for example two three-dimensional objects (i=1, i=2)) to be determined on a current plane is shown as an existence probability ri(x,y,0) by normal distribution on the x-y plane as shown in FIG. 11(a), it is estimated that the three-dimensional object will be in the position with the existence probability ri $(x,y,\Delta t/2)$ shown in FIG. 11(b) in $\Delta t/2$ seconds and in the position with the existence probability $ri(x,y,\Delta t)$ shown in FIG. 11(c) in $\Delta t$ seconds.

The sum value of the probabilities of contact is calculated by integrating the existence probability $ri(x,y,\Delta t)$ of a three-dimensional object to be determined with respect to the position of the own vehicle 101 and obtaining the volume of the three-dimensional object i as a probability of contact $Ri(\Delta t)$ with the three-dimensional object i. In case there are more than one three-dimensional object to be determined, the sum value $Rt(\Delta t)$ is used as a determination criterion.

In this way, according to this exemplary embodiment, the current front/rear-directional acceleration aix(0), the current front/rear-directional velocity Vix(0), the current front/rear-directional position xi(0), the current lateral acceleration aiy(0), the current lateral velocity Viy(0), and the current lateral position yi(0) of each of the three-dimensional objects to be determined are calculated by way of statistical processing while considering an error caused by a camera. These values are used in statistical processing to obtain the front/rear-directional acceleration after $\Delta t$ seconds $aix(\Delta t)$, the front/rear-directional velocity after $\Delta t$ seconds $Vix(\Delta t)$, the front/rear-directional position after $\Delta t$ seconds $xi(\Delta t)$, the lateral acceleration after $\Delta t$ seconds $aiy(\Delta t)$, the lateral velocity after $\Delta t$ seconds $Viy(\Delta t)$, and the lateral position after $\Delta t$ seconds $yi(\Delta t)$. Then, the existence probability after $\Delta t$ seconds $ri(x,y,\Delta t)$ is calculated. Based on the existence probability after $\Delta t$ seconds $ri(x,y,\Delta t)$, each probability of contact $Ri(\Delta t)$ is calculated and their sum value $Rt(\Delta t)$ is obtained. It is thus possible to statistically consider and estimate the possibility of a three-dimensional object ahead coming in contact with the own vehicle 101 without correctly obtaining the position of the three-dimensional object in a wide area where all the three-dimensional objects on a plane in front of the own vehicle are determined, thereby utilizing the calculation result for control with a natural feel.

While this exemplary embodiment supports the probability of contact $Ri(\Delta t)$ (with of the three-dimensional objects existing on a place ahead, the probability of contact with one three-dimensional object in front of the own vehicle 101 may be supported. This makes it unnecessary to obtain a sum value of the probabilities of contact.

While a preceding vehicle is recognized based on an image from a stereo camera in this exemplary embodiment, any other technique may be used. For example, information from a millimeter wave radar and a single-lens camera may be used instead.

Execution goes to S307 in FIG. 9.

First, an objective function L preset by this exemplary embodiment will be described. The objective function L determined by this exemplary embodiment is shown as the expression (130).

$$L=\delta FvT \cdot W\delta F \cdot \delta Fv + \lambda(\Delta t)vT \cdot W\lambda \cdot \lambda(\Delta t)v \quad (130)$$

The suffix v of $\lambda(\Delta t)v$ represents a vector amount and $\delta Fv$ is a target behavior correction amount as described earlier. $\lambda(\Delta t)v$ is a vector whose elements are the sum value $Rt(\Delta t)$ of the probabilities of contact and the frictional circle utilization factor $\mu r(\Delta t)$. $W\delta F$ is a weighting factor of realizability of driver request behavior preset through experiments. $W\lambda$ is a weighting factor of reduction of the sum value $Rt(\Delta t)$ of the probabilities of contact and reduction of the frictional circle utilization factor μr (Δt) preset through experiments. These are obtained in accordance with the expressions (131) through (134).

$$\delta Fv = \begin{Bmatrix} \delta Fx \\ \delta Mz \end{Bmatrix} \quad (131)$$

$$\lambda(\Delta t)v = \begin{Bmatrix} Rt(\Delta t) \\ \mu r(\Delta t) \end{Bmatrix} \quad (132)$$

$$W\delta F = \begin{bmatrix} W\delta Fx & 0 \\ 0 & W\delta Mz \end{bmatrix} \quad (133)$$

$$W\lambda = \begin{bmatrix} WR & 0 \\ 0 & W\mu \end{bmatrix} \quad (134)$$

When the objective function takes the minimum value, the expression (135) holds true.

$$(\partial L/\partial \delta Fv)=0 \quad (135)$$

When the δFv is sufficiently small, λ(Δt)v can be approximated using the following expression (136). Note that the value considering the calculation result is obtained for iterative operation.

$$\lambda(\Delta t)v = \lambda(\Delta t)v + J \cdot \delta Fv \quad (136)$$

where J is a Jacobian matrix and obtained in accordance with the expression (137).

$$J = \begin{bmatrix} (\partial Rt(\Delta t)/\partial Fx) & (\partial Rt(\Delta t)/\partial Mz) \\ (\partial \mu r(\Delta t)/\partial Fx) & (\partial \mu r(\Delta t)/\partial Mz) \end{bmatrix} \quad (137)$$

From the expressions (130), (135) and (136), the target behavior correction amount δFv is obtained using the expression (139).

$$2 \cdot W\delta F \cdot \delta Fv + 2 \cdot J^T \cdot W\lambda(\lambda(\Delta t)v + J \cdot \delta Fv) = 0 \quad (138)$$

Thus $$\delta Fv = (J^T \cdot W\lambda \cdot J + W\delta F)^{-1} \cdot (-J^T \cdot W\lambda \cdot \lambda(\Delta t)v) \quad (139)$$

In this way, δFv obtained using the expression (139) is defined as a correction value δFεv for the target behavior correction amount δFv. δFεv is added to δFv and the objective function L is iteratively calculated. When the objective function L takes a value smaller than a preset value ε (sufficiently small value), δFv then obtained is determined as a final target behavior correction amount δFv.

In S307, the target behavior correction amount δFv calculated using the expression (139) is calculated as a correction value δFεv for the target behavior correction amount δFv.

In S308, the previous target behavior correction amount δFv is corrected with the correction value δFεv. That is, $$\delta Fv = \delta Fv + \delta F\varepsilon v \quad (140)$$

In S309, the new target behavior correction amount δFv calculated in S308 is used to calculate the objective function L again.

In S310, it is determined whether the objective function L used for calculation in S109 takes a value smaller than the preset value ε (sufficiently small value). In case the value is not smaller than ε, processing from S304 is repeated.

In case the objective function L used for the calculation in S309 takes a value smaller than the preset value ε (sufficiently small value), it is determined that the then target behavior correction amount δFv is a final target behavior correction amount δFv. Execution proceeds to S311.

In S311, the target front/rear-directional force Fx obtained in S302, target yaw moment Mz, and final target behavior correction amount δFv are used to calculate the brake pressures on the wheels (left front wheel brake pressure Pfl, right front wheel brake pressure Pfr, left rear wheel brake pressure Prl, right rear wheel brake pressure Prr) are calculated, and the obtained value is output to the brake driving part 113 and the program is exited.

$$Pfl = kpfl \cdot Fxfl \quad (141)$$

$$Pfr = kpfr \cdot Fxfr \quad (142)$$

$$Prl = kprl \cdot Fxrl \quad (143)$$

$$Prr = kprr \cdot Fxrr \quad (144)$$

where kpfl, kpfr, kprl and kprr are conversion factors previously obtained through experiments or calculations. Fxfl, Fxfr, Fxrl and Fxrr are calculated using the expressions (149) and (150) assuming that the left swivel direction is positive and the conditions of the expressions (145) through (148) are satisfied.

$$Fxfl + Fxfr + Fxrl + Fxrr = Fx + \delta Fx \quad (145)$$

$$(df/2) \cdot (Fxfr - Fxfl) + (dr/2) \cdot (Fxrr - Fxrl) = Mz + \delta Mz \quad (146)$$

where df is a front wheel tread and dr is a rear wheel tread.

$$Fxfl = Fxrl \quad (147)$$

$$Fxfr = Fxrr \quad (148)$$

$$Fxfl = Fxrl = (Fx + \delta Fx)/4 - (Mz + \delta Mz)/df + dr \quad (149)$$

$$Fxrl = Fxrr = (Fx + \delta Fx)/4 + (Mz + \delta Mz)/df + dr \quad (150)$$

According to the present exemplary embodiment, the target behavior (target front/rear-directional force Fx, target yaw moment Mz) estimated mainly from the driver operation of the own vehicle 101 is calculated an objective function L is preset that includes the frictional circle utilization factor μr(Δt) of the own vehicle 1 after Δt seconds as a preset time (for example 0.5 seconds), the sum value Rt(Δt) of the probabilities of contact with all the three-dimensional objects as determination objects, and the correction amount of target behavior δFv (the suffix v indicates a vector amount) and provides a minimum value, and the target behavior correction amount δFv where the objective function takes the minimum value is calculated. A control amount is determined based on the target behavior and the target behavior correction amount δFv. The control amount thus obtained is used to execute automatic brake control. It is thus possible to integrate vehicle behavior control and driving assistance control to efficiently and stably perform the resulting coordinated control.

While automatic brake control is used as an actuator to provide vehicle behavior control in this exemplary embodiment, any other vehicle behavior control may be used. This is especially a control by way of a front/rear-directional driving force distribution control device, a lateral driving force distribution control device or an automatic steering control device and any combination thereof. On a vehicle where the driving force of each wheel is independently controlled with an electric motor, it is possible to control the driving motor with the control amount obtained in accordance with the invention.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A collision determination device, comprising:
   three-dimensional object detection means for detecting a three-dimensional object;
   current state processing means for calculating current motion and positional states of the three-dimensional object, based at least on a current detected data of the three-dimensional object, as probability distributions by a statistical process;
   state estimation means for estimating motion and positional states of the three-dimensional object after a preset time period, by a statistical process, based on the calculated current motion and positional states in relationship to a subject vehicle; and
   contact probability calculation means for calculating a probability of contact with the three-dimensional object based on the estimated positional state of the three-dimensional object as a probability distribution after the preset time period,
   wherein the current state processing means calculates the current motion and positional states as a normal distribution having axes on a true value, and
   wherein the contact probability calculation means calculates the probability of contact based on an integration of the estimated positional state of the three-dimensional object, and a range of the integration is determined based on a position of the subject vehicle after the preset time period, where the estimated positional state of the three-dimensional object is calculated in relation to current motion and position data of the subject vehicle.

2. The collision determination device according to claim 1, wherein the collision determination device is mounted on a movable body, and
   the collision determination device further comprises control means for performing at least one of deceleration control, alarm control and provision of alert information based on the contact probability.

3. The collision determination device according to claim 1, wherein the three-dimensional object comprises a three-dimensional object existing ahead of the subject vehicle,
   the current motion and positional states of the three-dimensional object calculated by the current state processing means by the statistical process are obtained using a front/rear-directional distribution of the subject vehicle,
   the motion and positional states of the three-dimensional object after the preset time period estimated by the state estimation means are obtained using a front/rear-directional distribution of the subject vehicle after the preset time period, and
   the contact probability calculation means calculates the probability of contact based on the front/rear-directional distribution of the positional states of the three-dimensional object after the preset time period and the position of the subject vehicle.

4. The collision determination device according to claim 1, wherein the three-dimensional object comprises a three-dimensional object existing on a plane ahead of the subject vehicle,
   the current motion and positional states of the three-dimensional object calculated by the current state processing means by the statistical process are obtained using a front/rear-directional distribution and a lateral distribution of the subject vehicle,
   the motion and positional states of the three-dimensional object after the preset time period estimated by the determination object state estimation means are obtained using the front/rear-directional distribution and the lateral distribution of the subject vehicle after the preset time period, and
   the contact probability calculation means calculates the probability of contact based on the front/rear-directional distribution and the lateral distribution of the positional state of the three-dimensional object after the preset time period and the position of the subject vehicle.

5. The collision determination device according to claim 4, further comprising:
   target three-dimensional object selection means for extracting three-dimensional objects for determining possibilities of contact from among the detected three-dimensional objects,
   wherein more than one three-dimensional object is selected by the target three-dimensional object selection means.

6. The collision determination device according to claim 5, wherein the control means performs at least one of deceleration control, alarm control and provision of alert information based on a sum value of the contact probability calculated for each of the target three-dimensional objects.

7. The collision determination device according to claim 1, wherein the estimated positional state of the three-dimensional object includes a positional information, and
   wherein an integration of the positional information comprises a constant value over time.

8. The collision determination device according to claim 1, wherein the current state processing means generates the positional state information by using a deviation amount between corresponding positions through a triangulation technique from a stereo image ahead of the subject vehicle.

9. The collision determination device according to claim 1, wherein the three-dimensional object detection means comprises a stereo camera, and the state processing means calculates the current motion and positional states as a normal distribution whose axes are on a true value.

10. The collision determination device according to claim 1, wherein the contact probability calculation means calculates the probability of contact without obtaining an actual position of the object.

11. The collision determination device according to claim 1, wherein the three-dimensional object detection means detects objects ahead of the subject vehicle in a horizontal two-dimensional plane.

12. The collision determination device according to claim 1, wherein the current motion and positional states of the three-dimensional object include a position, a velocity, and an acceleration.

13. The collision determination device according to claim 1, wherein a front/rear-directional distribution of the subject vehicle comprises a position distribution in a direction comprising a normal distribution.

14. A vehicle behavior control device, comprising:
target behavior calculation means for calculating a target behavior of a subject vehicle based on a driving state of the subject vehicle;
three-dimensional object information detection means for detecting three-dimensional object information ahead of the subject vehicle;
determination object selection means for extracting a determination object whose possibility of contact with the subject vehicle is determined out of the detected three-dimensional objects;
determination object current state processing means for calculating current motion and positional states of the determination object, based at least on a current detected state data of the three-dimensional object, as probability distributions;
determination object state estimation means for estimating motion and positional states of the determination object as probability distributions after a preset time period based on the calculated current motion and positional states of the determination object;
contact probability calculation means for calculating a probability of contact of the subject vehicle with the determination object based on the motion and positional states of the determination object after the preset time period estimated by the determination object state estimation means;
target behavior correction amount calculation means for setting an objective function relating at least the probability of contact and a target behavior correction amount and providing a minimum value, and calculating the target behavior correction amount where the objective function takes the minimum value; and
control means for setting a control amount based on the target behavior and the target behavior correction amount,
wherein the determination object current state processing means calculates the current motion and positional states as a normal distribution having axes on a true value, and
wherein the contact probability calculation means calculates the probability of contact based on an integration of the estimated positional state of the three-dimensional object, and a range of the integration is determined based on a position of the subject vehicle after the preset time period, where the estimated positional state of the three-dimensional object is calculated in relation to current motion and position data of the subject vehicle.

15. The vehicle behavior control device according to claim 14, wherein the target behavior of the subject vehicle calculated by the target behavior calculation means includes a target front/rear-directional force and a target yaw moment.

16. The vehicle behavior control device according to claim 14, wherein the determination object current state processing means calculates the current motion and positional states of the determination object by a statistical process, and
the determination object state estimation means estimates the motion and positional states of the determination object after the preset time period based on the current motion and positional states of the determination object calculated by the statistical process.

17. The vehicle behavior control device according to claim 14, wherein the determination object extracted by the determination object selection means comprises a three-dimensional object existing on a plane ahead of the subject vehicle,
the current motion and positional states of the determination object calculated by the determination object current state processing means by the statistical processing are obtained using a front/rear-directional distribution and a lateral distribution of the subject vehicle,
the motion, and positional states of the determination object after the preset time period estimated by the determination object state estimation means are obtained using the front/rear-directional distribution and lateral distribution of the subject vehicle after the preset time period, and
the contact probability calculation means calculates the probability of contact based on the front/rear-directional distribution and lateral distribution of the positional state of the determination object after the preset time period and the position of the subject vehicle.

18. The vehicle behavior control device according to claim 17, wherein more than one determination objects are set by the determination object selection means.

19. The vehicle behavior control device according to claim 14, further comprising:
frictional circle utilization factor calculation means for calculating a frictional circle utilization factor of the subject vehicle after the preset time period,
wherein the target behavior correction amount calculation means presets the objective function including at least the frictional circle utilization factor, the probability of contact and the target behavior correction amount and providing the minimum value, and calculates the target behavior correction amount where the objective function takes the minimum value.

20. The collision determination device according to claim 14, wherein the estimated positional state of the determination object includes a positional information, and
wherein an integration of the positional information comprises a constant value over time.

* * * * *